United States Patent [19]
Gaddy

[11] Patent Number: 5,342,524
[45] Date of Patent: Aug. 30, 1994

[54] PERFORMANCE OF ANAEROBIC DIGESTERS

[76] Inventor: James L. Gaddy, 2207 Tall Oaks Dr., Fayetteville, Ark. 72703

[21] Appl. No.: 705,725

[22] Filed: May 24, 1991

[51] Int. Cl.$^5$ ............................................. C02F 3/28
[52] U.S. Cl. .................................. 210/610; 210/603; 210/631; 435/801
[58] Field of Search ............... 210/605, 610, 611, 631, 210/603, 630; 435/801

[56] References Cited

U.S. PATENT DOCUMENTS

| | | | |
|---|---|---|---|
| Re. 31,924 | 6/1985 | Starr | 210/610 |
| 1,797,157 | 3/1931 | Rudolfs | 210/631 |
| 4,213,857 | 7/1980 | Ishida et al. | 210/603 |
| 4,316,961 | 2/1982 | Klass et al. | 210/603 |
| 4,329,428 | 5/1982 | Ghosh et al. | 210/611 |
| 4,342,650 | 8/1982 | Erickson et al. | 210/631 |
| 4,374,199 | 2/1983 | Carter | 210/603 |
| 4,481,293 | 11/1984 | Thomsen et al. | 210/603 |
| 4,503,154 | 3/1985 | Paton | 210/603 |
| 4,522,721 | 6/1985 | Ishida et al. | 210/603 |
| 4,540,666 | 9/1985 | Nukina et al. | 435/167 |
| 4,675,294 | 6/1987 | Finck et al. | 435/167 |
| 4,696,746 | 9/1987 | Gosh et al. | 210/603 |
| 4,722,741 | 2/1988 | Hayes et al. | 210/603 |
| 4,749,491 | 6/1988 | Lawes et al. | 210/610 |
| 4,883,753 | 11/1989 | Belaich et al. | 435/167 |
| 4,885,094 | 12/1989 | Srinivasan et al. | 210/610 |
| 5,071,559 | 12/1991 | Bleeker | 210/610 |

FOREIGN PATENT DOCUMENTS

| | | | |
|---|---|---|---|
| 55-155777 | 12/1980 | Japan | 210/610 |
| 56-038187 | 4/1981 | Japan | 210/610 |
| 60-058298A | 4/1985 | Japan | 210/610 |
| 63-080900A | 4/1988 | Japan | 210/610 |

OTHER PUBLICATIONS

Atlas et al., *Handbook of Microbiological Media*, CRC Press (1993), pp. 7, 50, 72, 89.
Marvin et al., "Release of Outer Membrane Fragments, etc.", *Journal of Bacteriology* (Oct. 1989), pp. 5262–5267.
Leive, Loretta, "Studies on the Permeability Change, etc.", *The Journal of Biological Chemistry*, vol. 243, No. 9 (May 10, 1968), pp. 2373–2380.
J5 3026 768 Date: Mar. 1978 Country: Japan Name: Mitsubishi.

*Primary Examiner*—Thomas Wyse
*Attorney, Agent, or Firm*—Boyd D. Cox

[57] ABSTRACT

Methods of improving anaerobic digestion by enhancing the microorganism population through the creation of a nutrient environment more favorable for microbial growth and through the addition of microbes and, more particularly, by the addition of chelating agents, chelating agents and nutrients, and methanogens. Methods for the improved production of said methanogens by the provision of controlled amount of methanol and $H_2$ and $CO_2$. Methods for the improved preservation of said methanogen by ultra-freezing and freeze-drying.

16 Claims, 19 Drawing Sheets

Methane Production from NTA Amended Culture

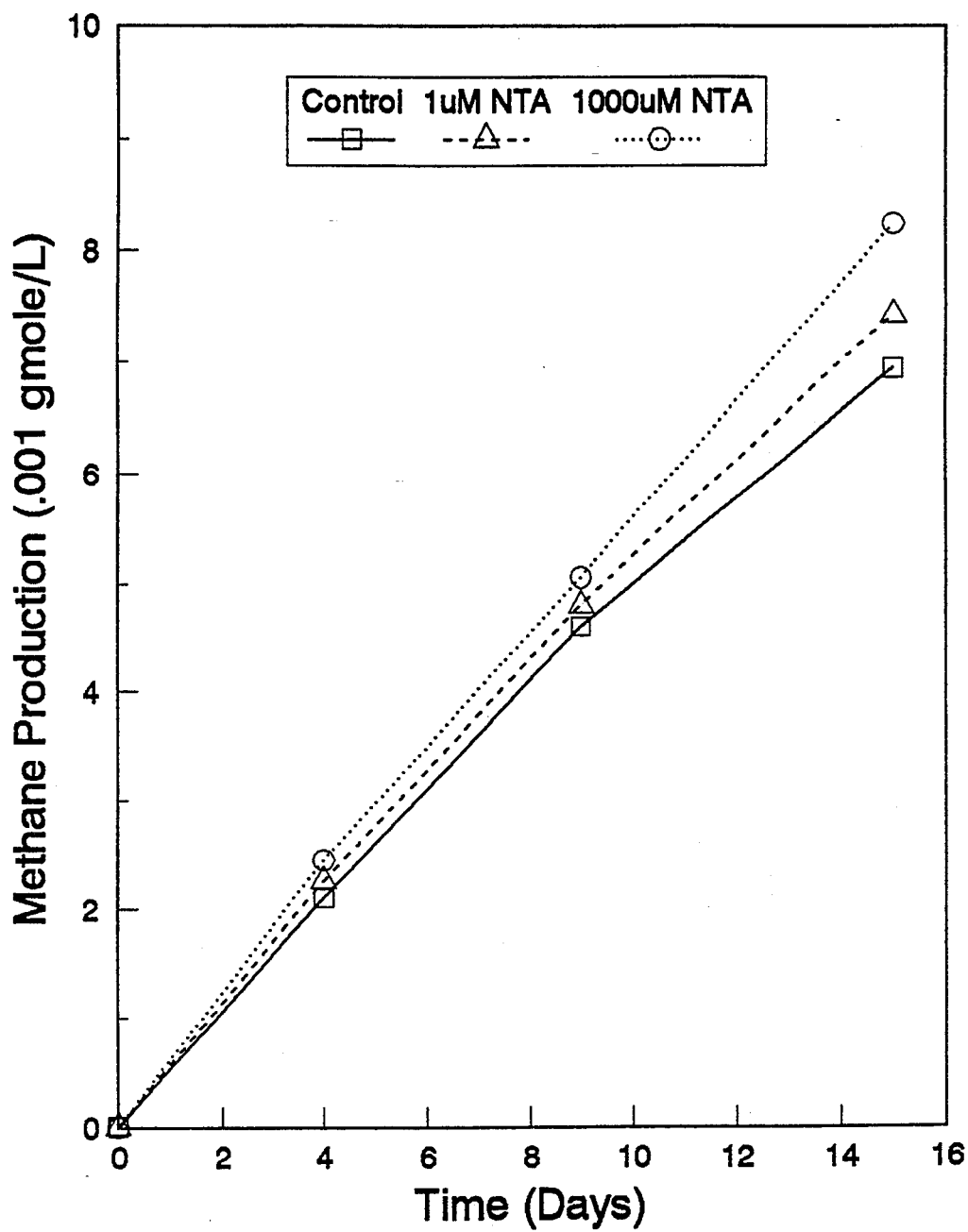
Figure 1. Methane Production from NTA Amended Culture

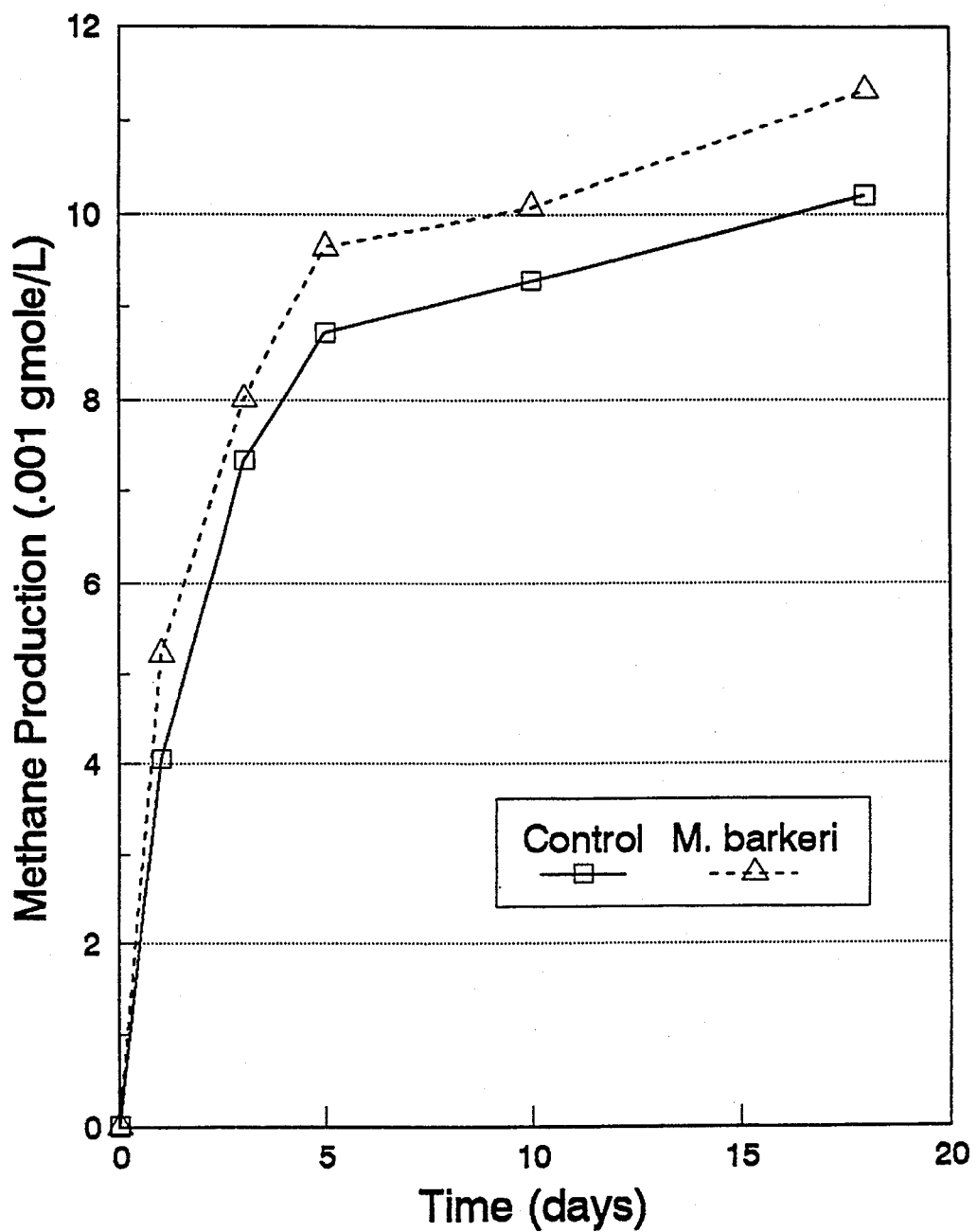
Figure 2. Methane Production from Methanogen Amended Culture

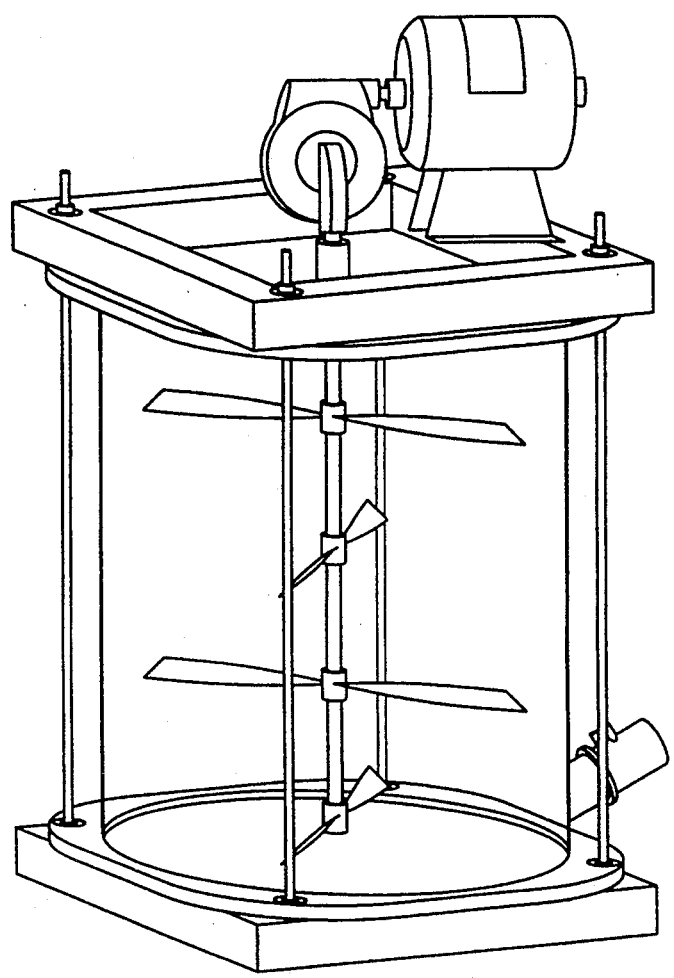
Figure 3. CSTR Reaction Vessel

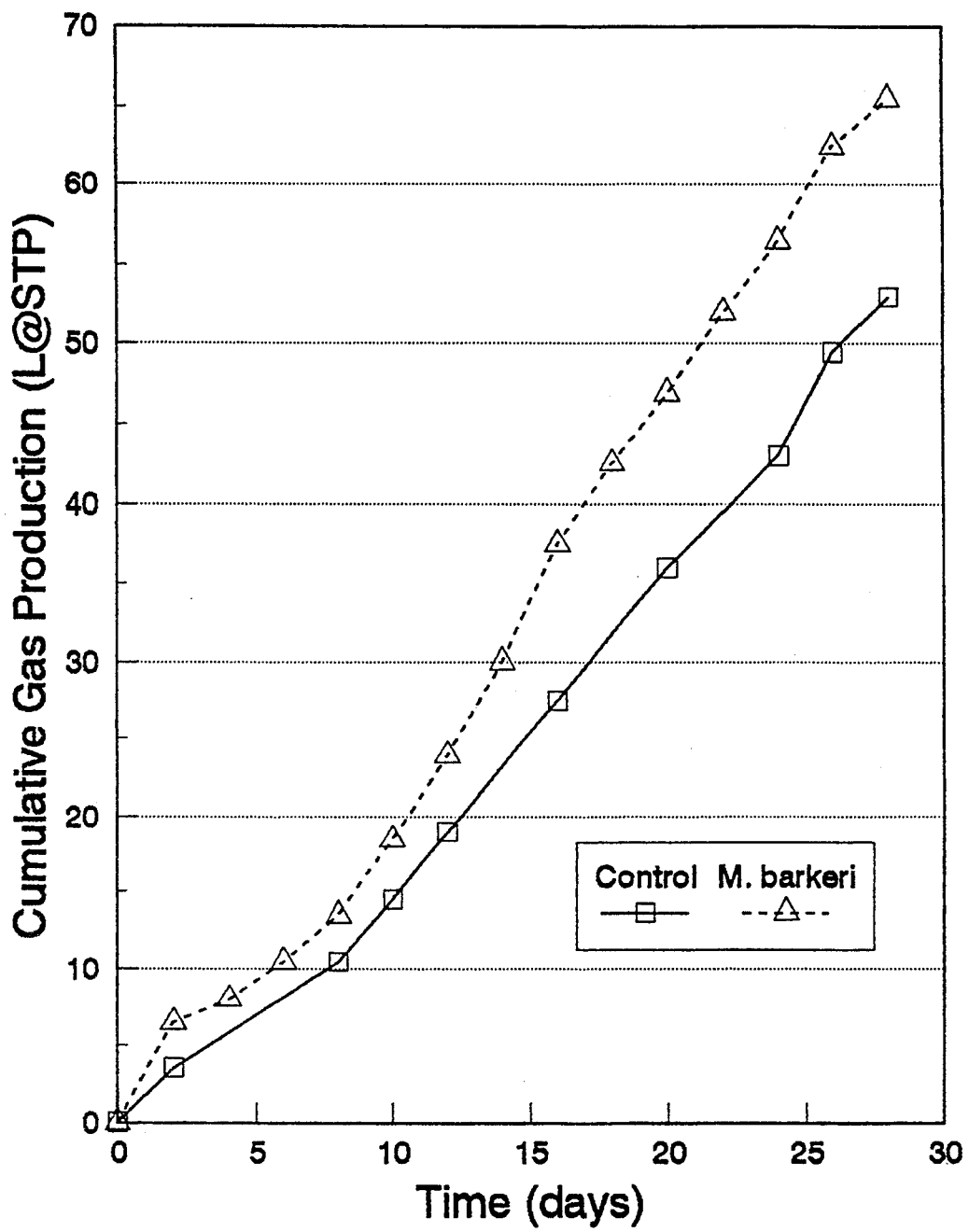
Figure 4. Cumulative Gas Production from Methanogen Amended Culture

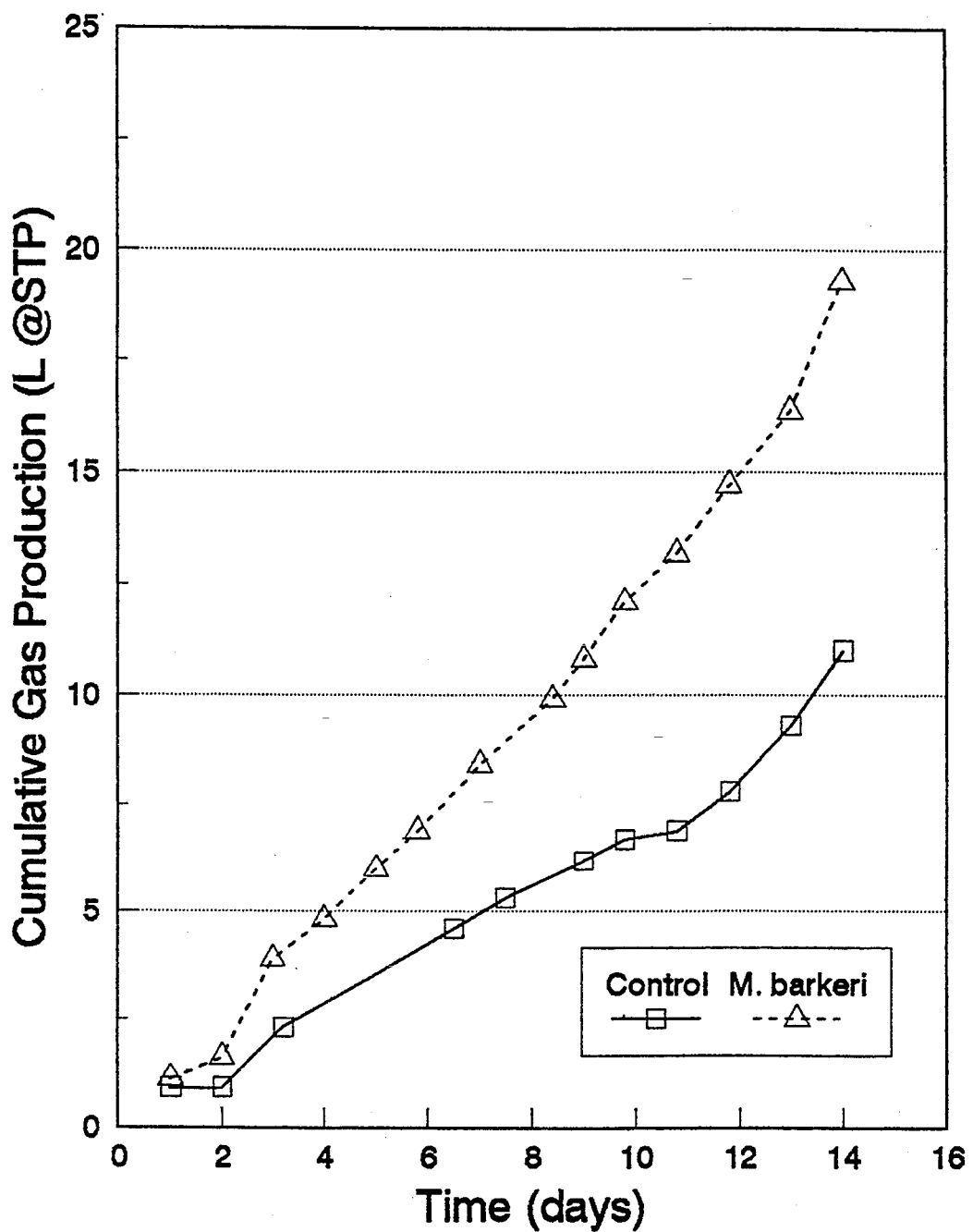
Figure 5. Cumulative Gas Production During Recovery of Upset Digesters

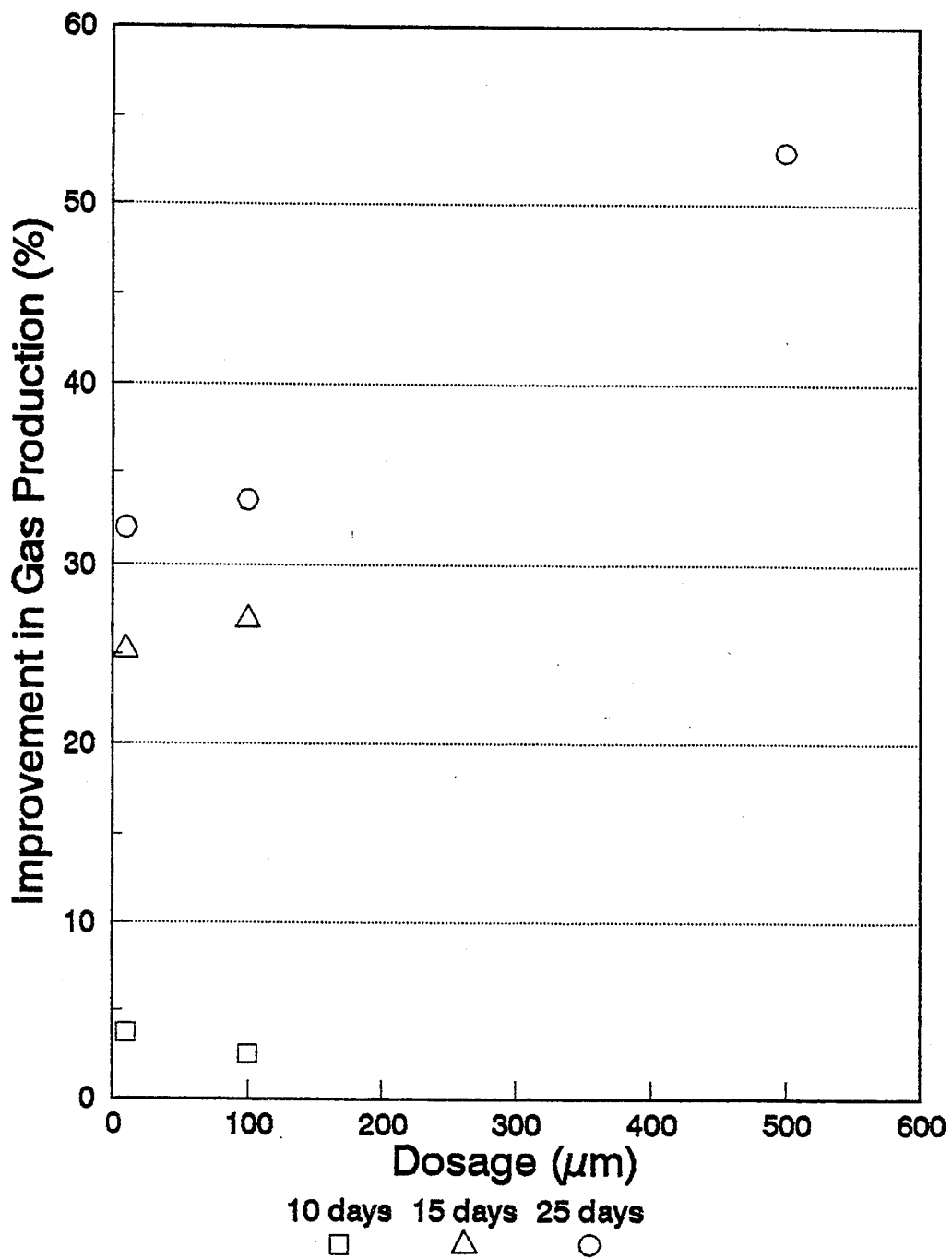
Figure 6. Gas Production Improvement with EDTA Amendment

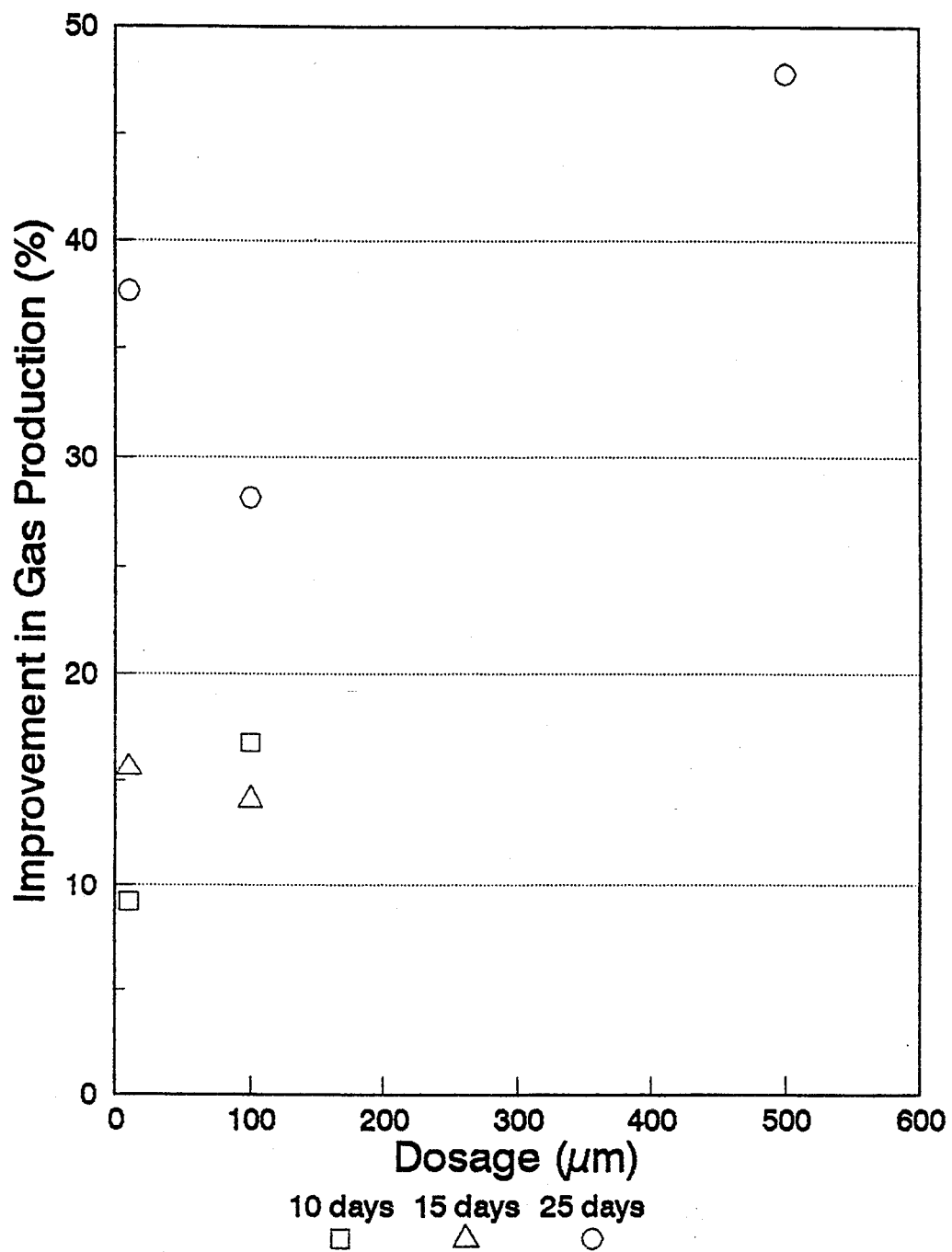
Figure 7. Gas Production Improvement with CA Amendment

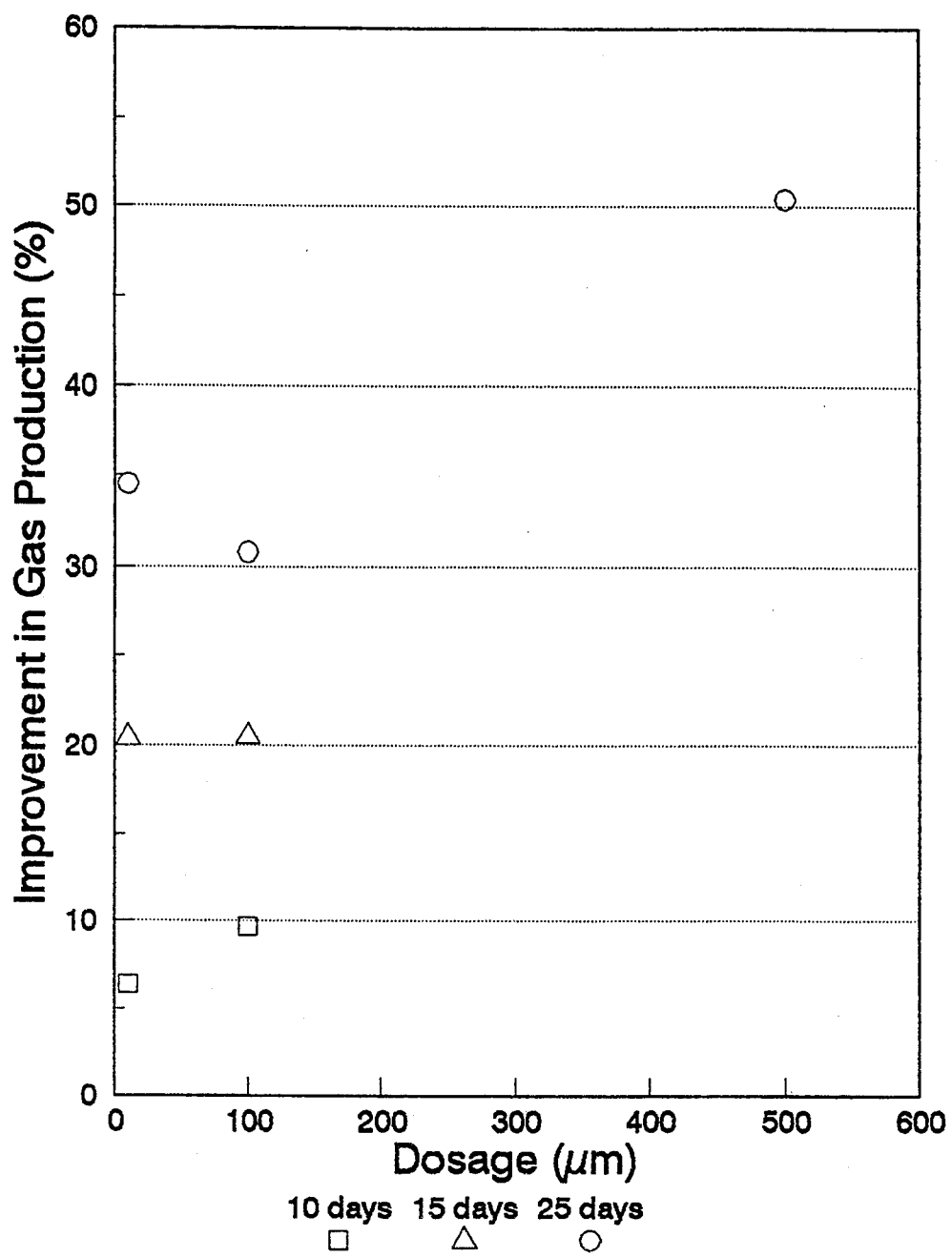
Figure 8. Average Gas Production Improvement for Chelating Agent Amendment

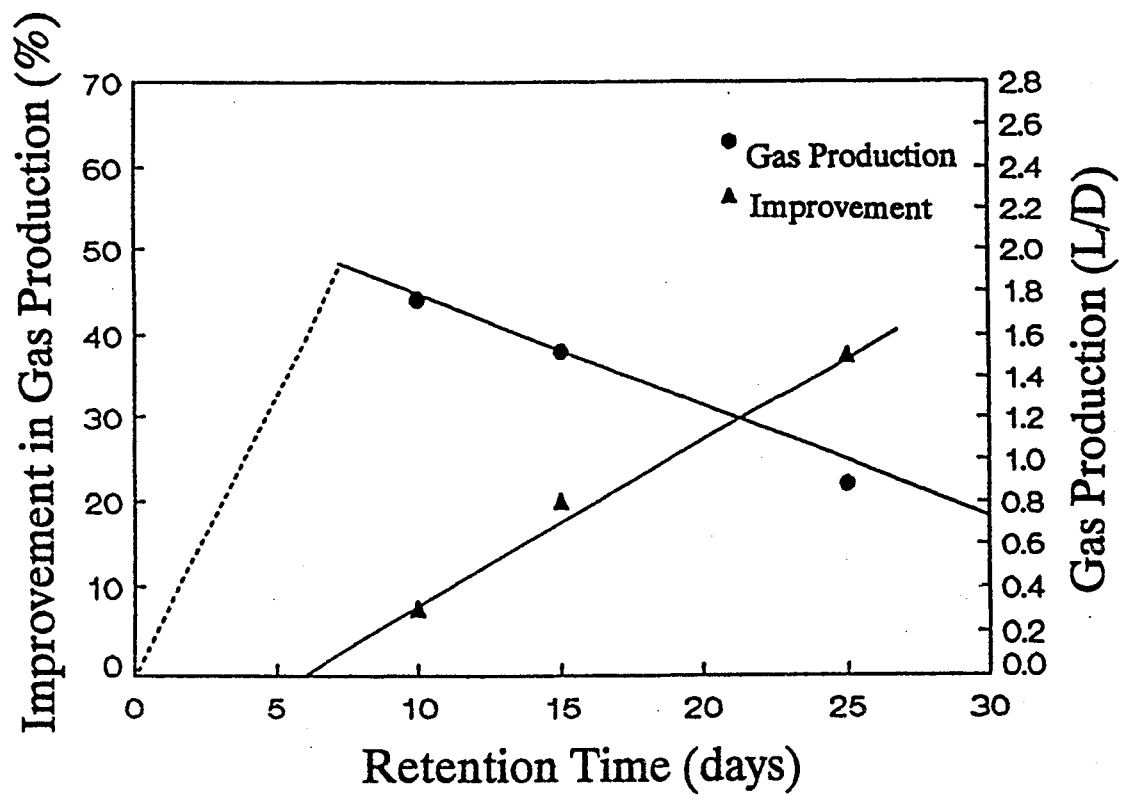
Figure 9. Average Gas Production/Improvement vs. Retention Time

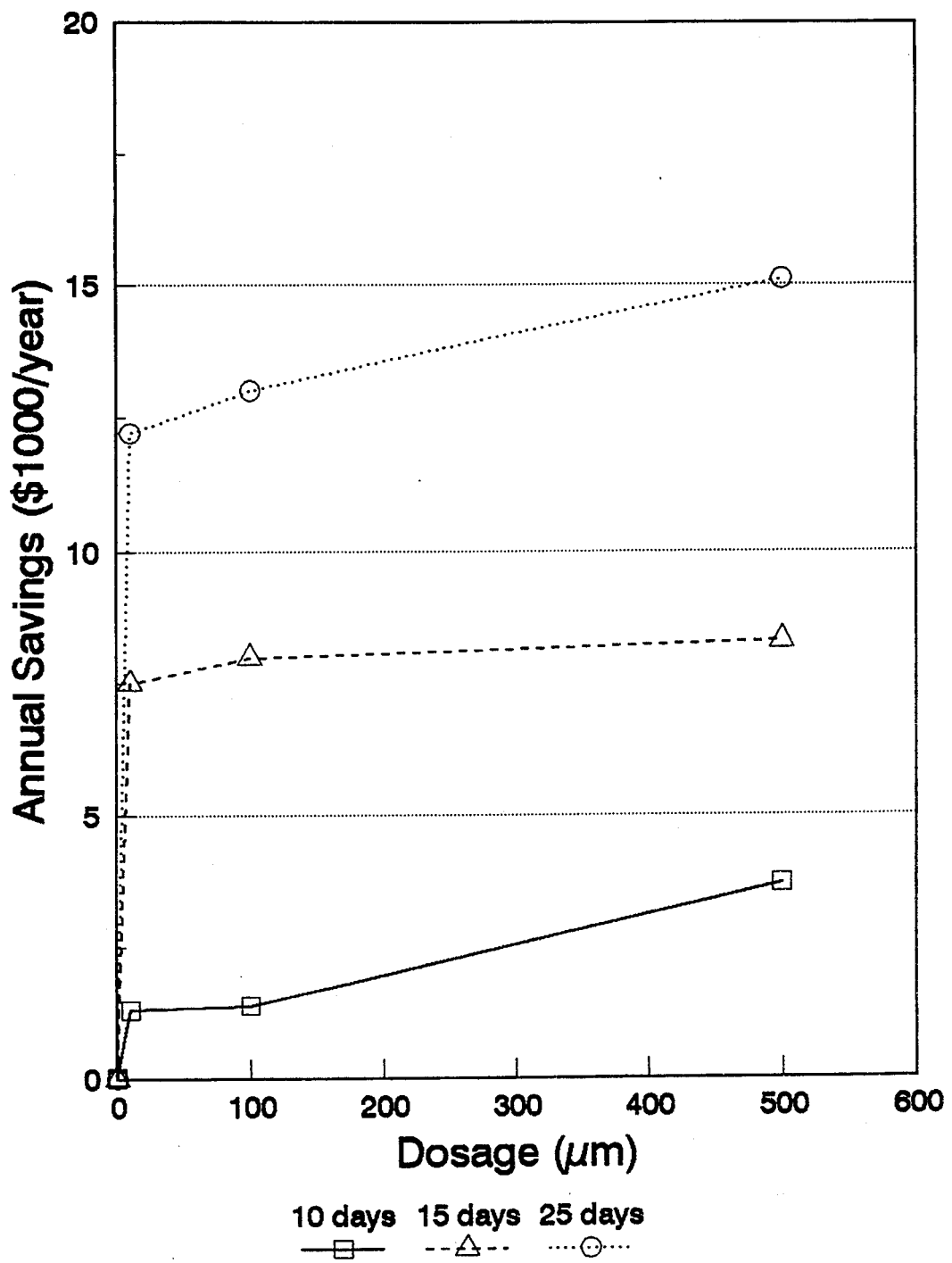
Figure 10. Annual Savings for EDTA Amendment

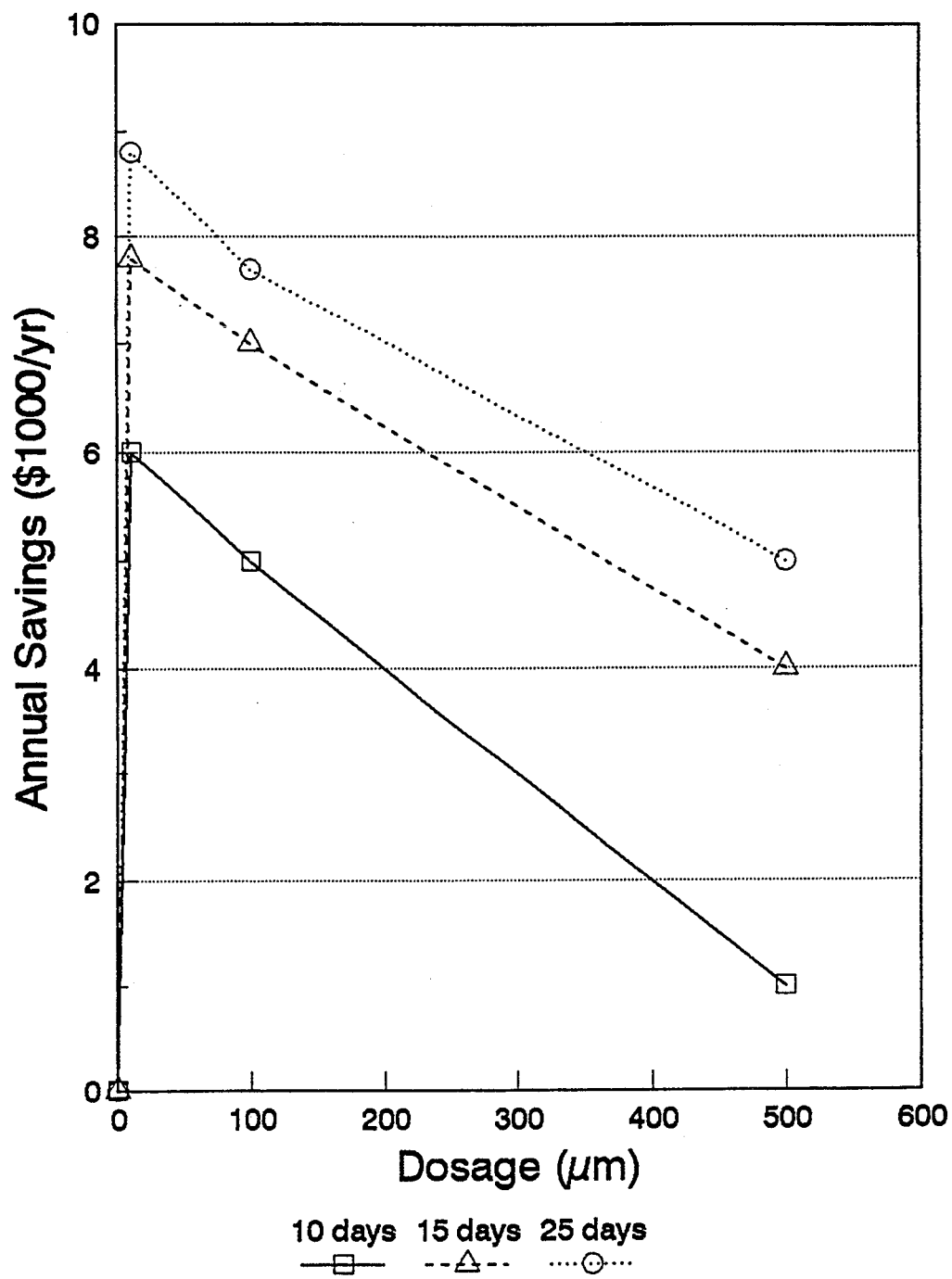
Figure 11. Annual Savings for CA Amendment

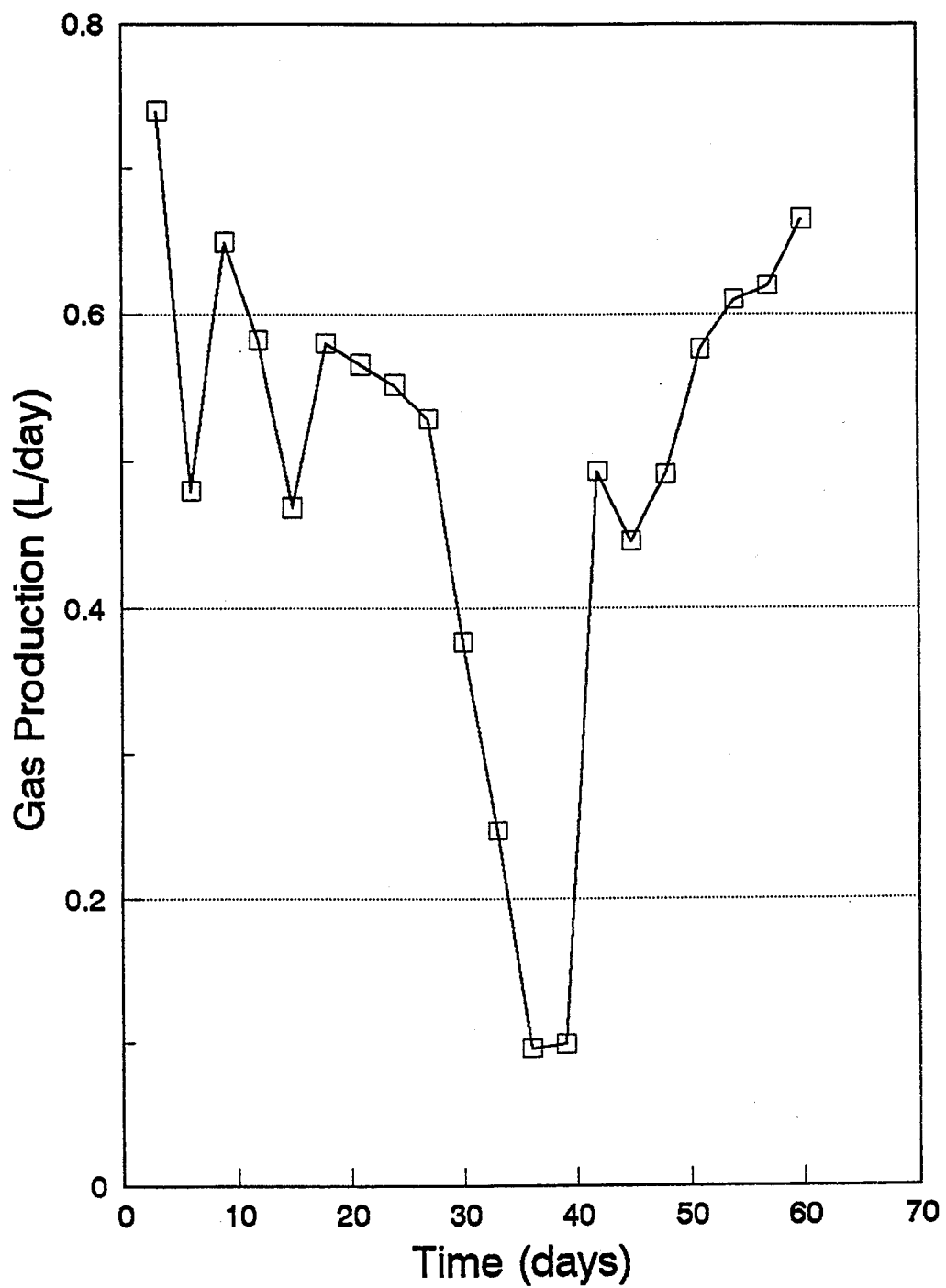
Figure 12. Gas Production of Control Reactor in 1 g/L Methanogen Test

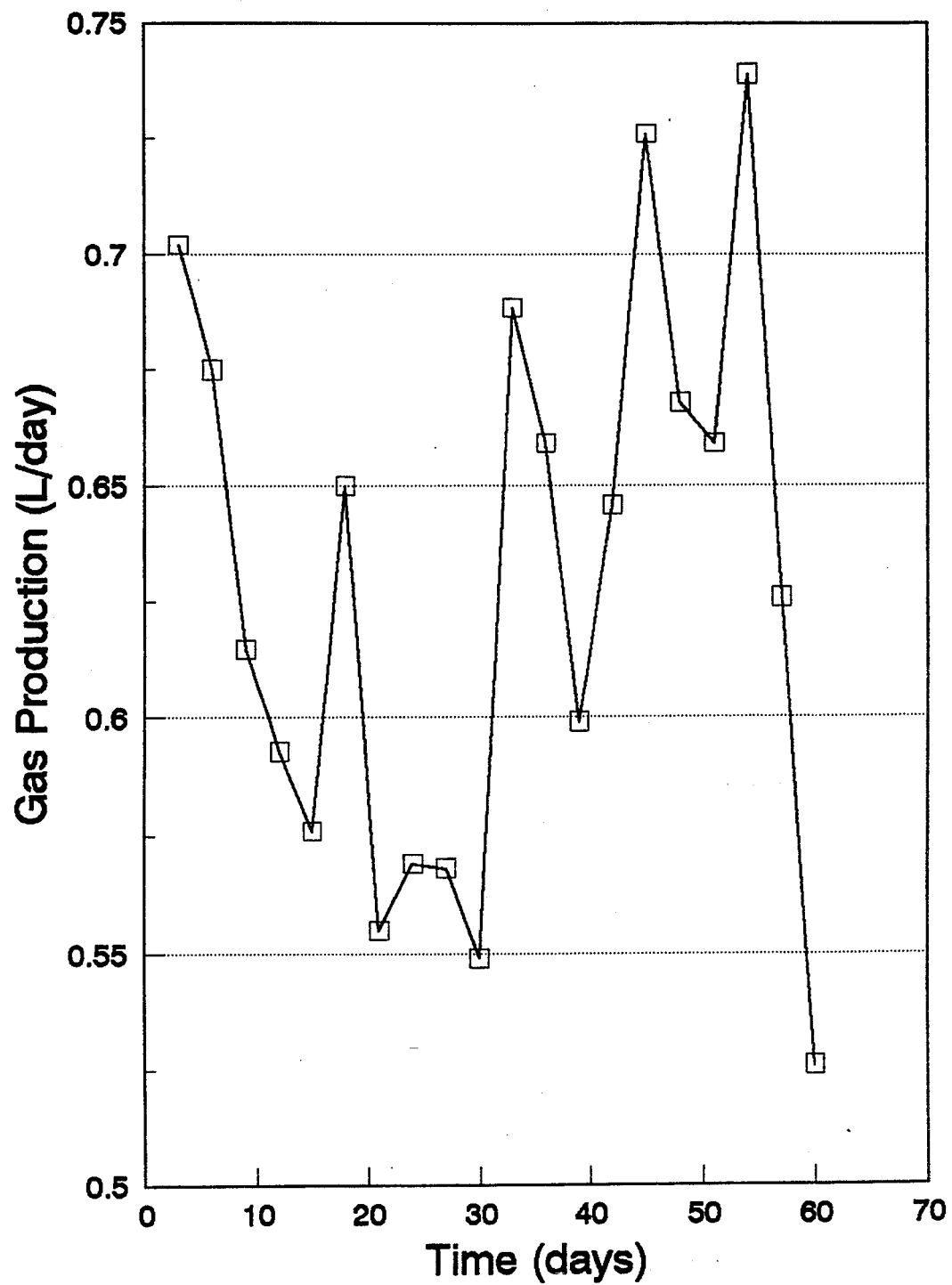
Figure 13. Gas Production of 1 g/L Methanogen Amended Reactor

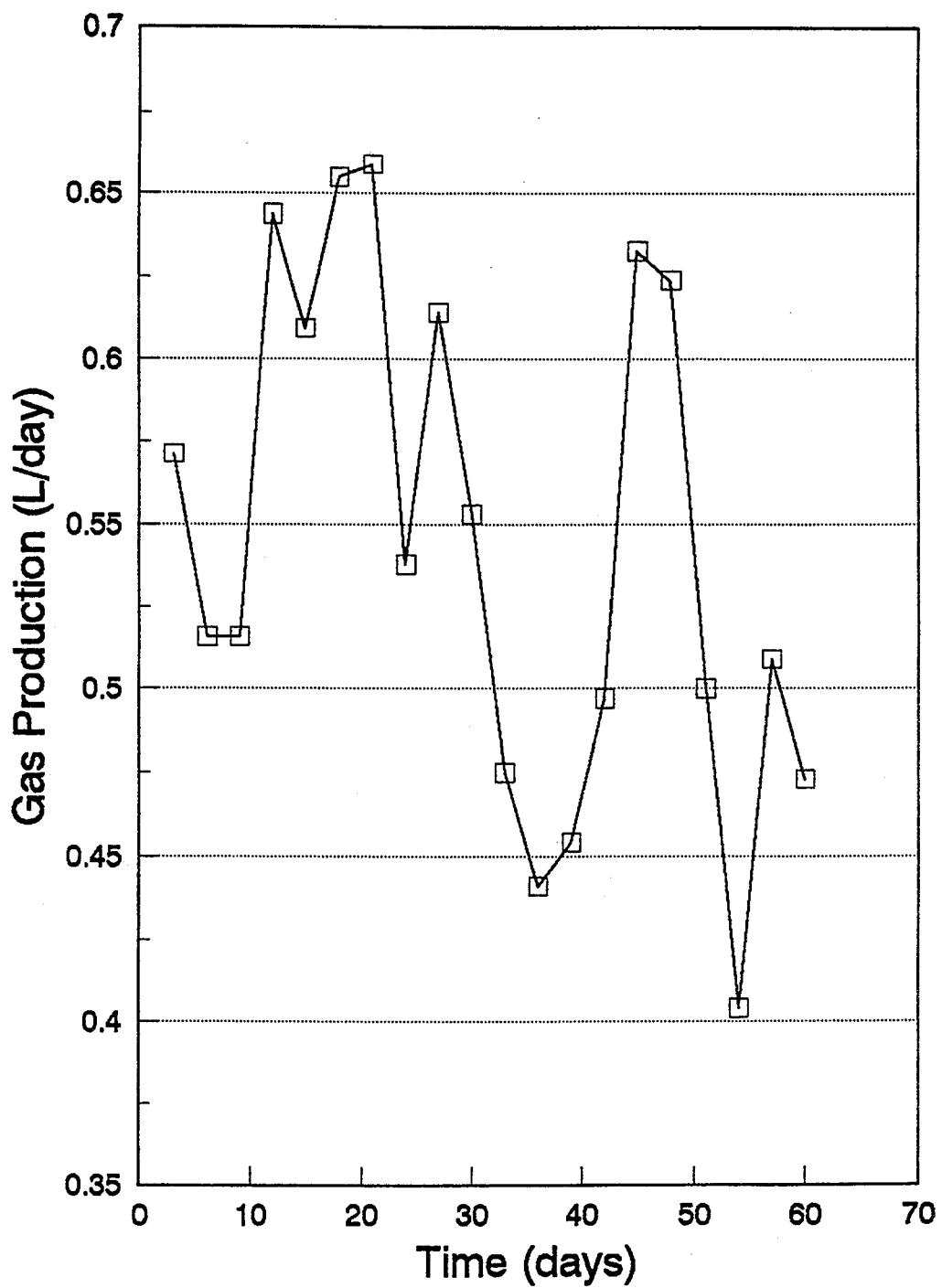
Figure 14. Gas Production of Control Reactor in 2 g/L Methanogen Test

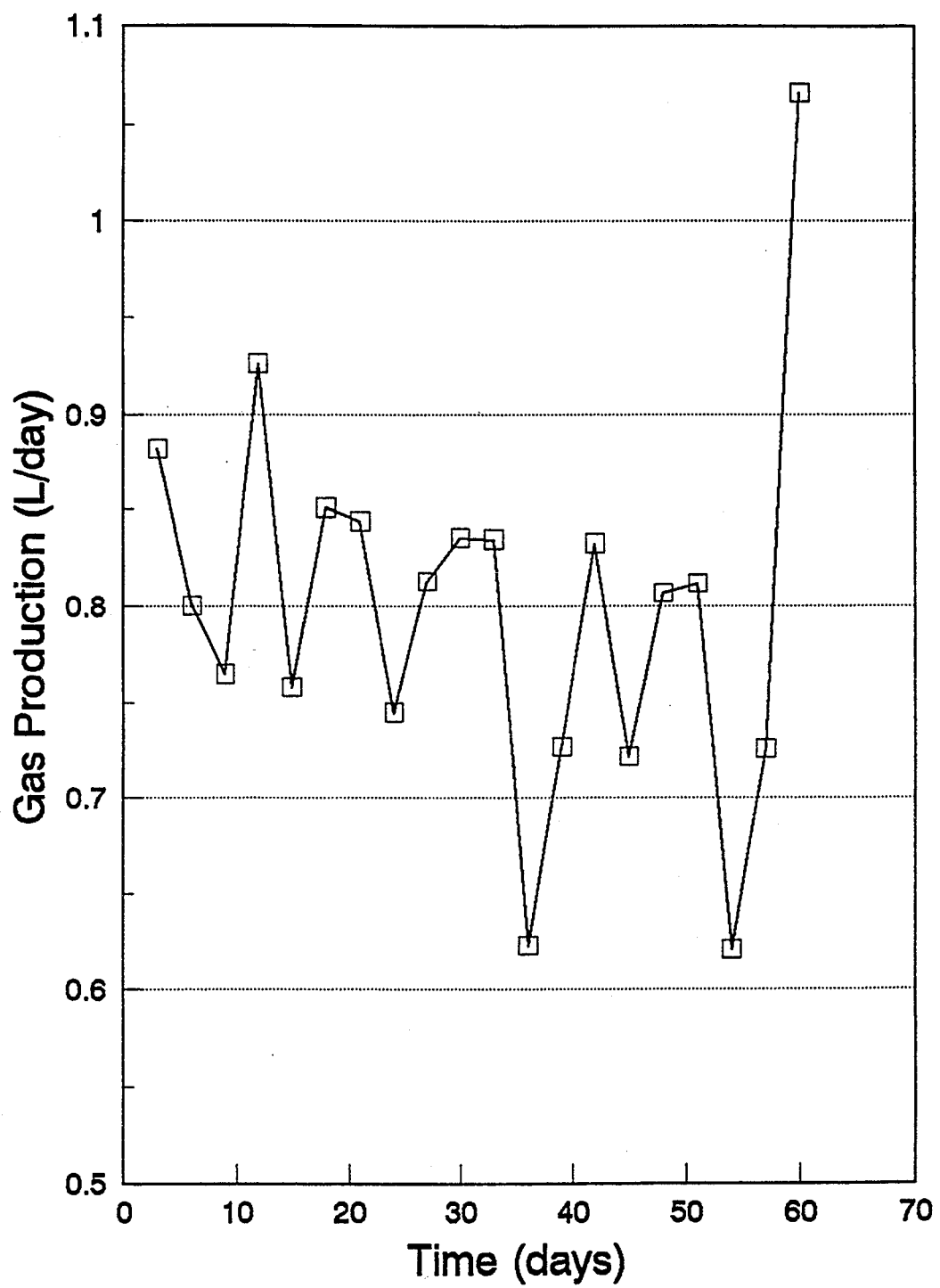
Figure 15. Gas Production of 2 g/L Methanogen Amended Reactor

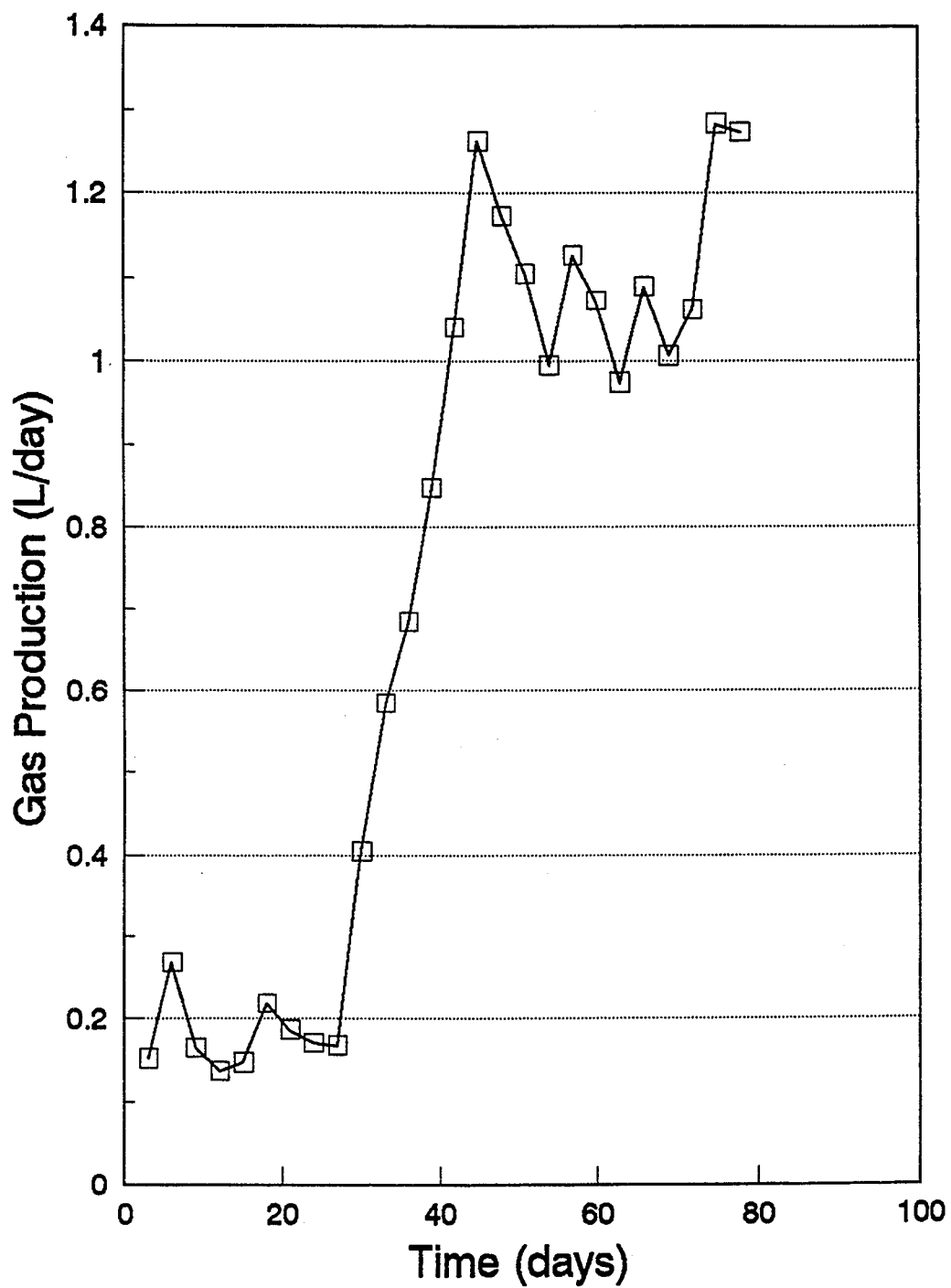
Figure 16. Gas Production of Upset Control Reactor in 3 g/L Methanogen Test

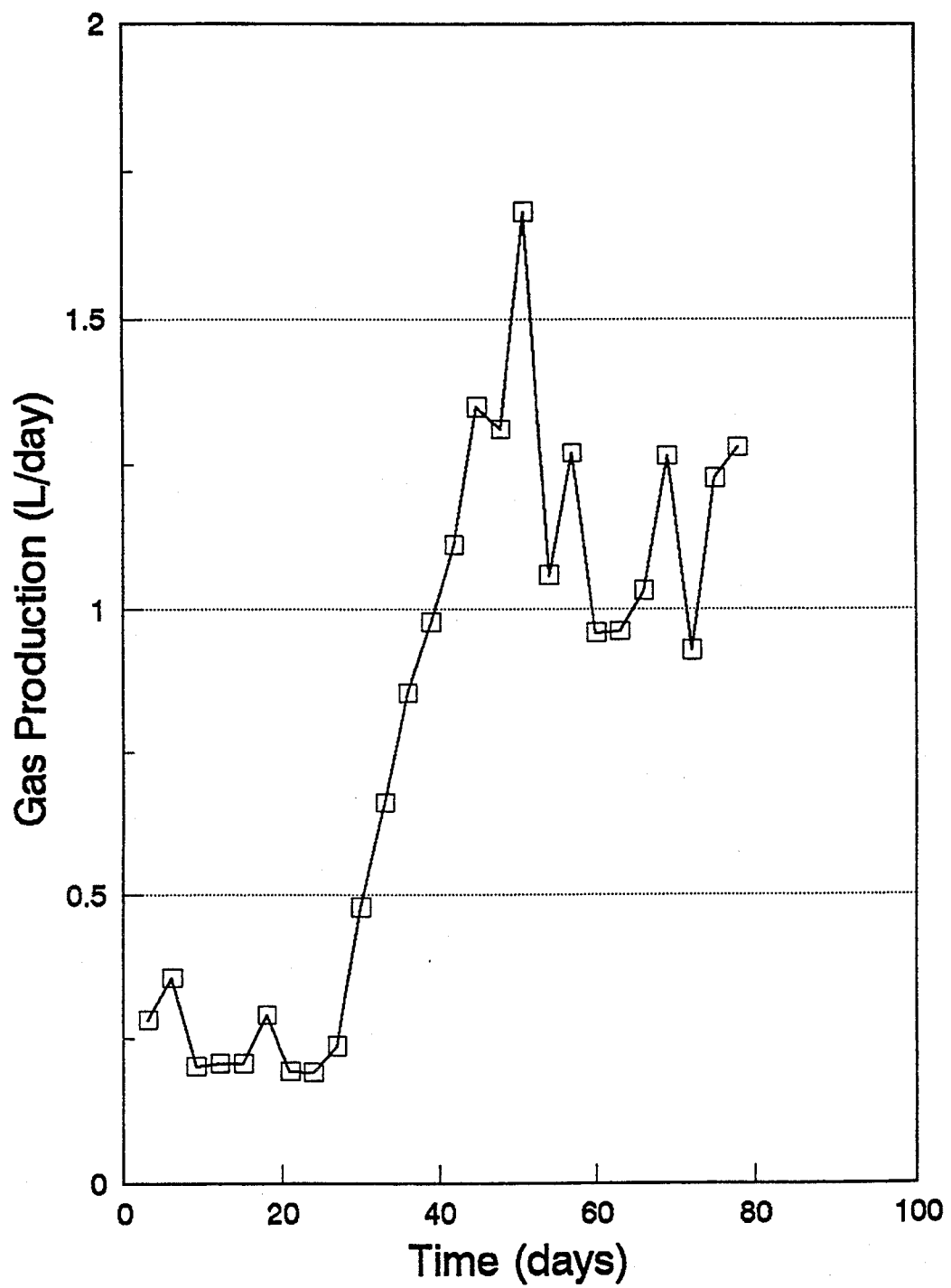
Figure 17. Gas Production of Upset and 3 g/L Amended Reactor

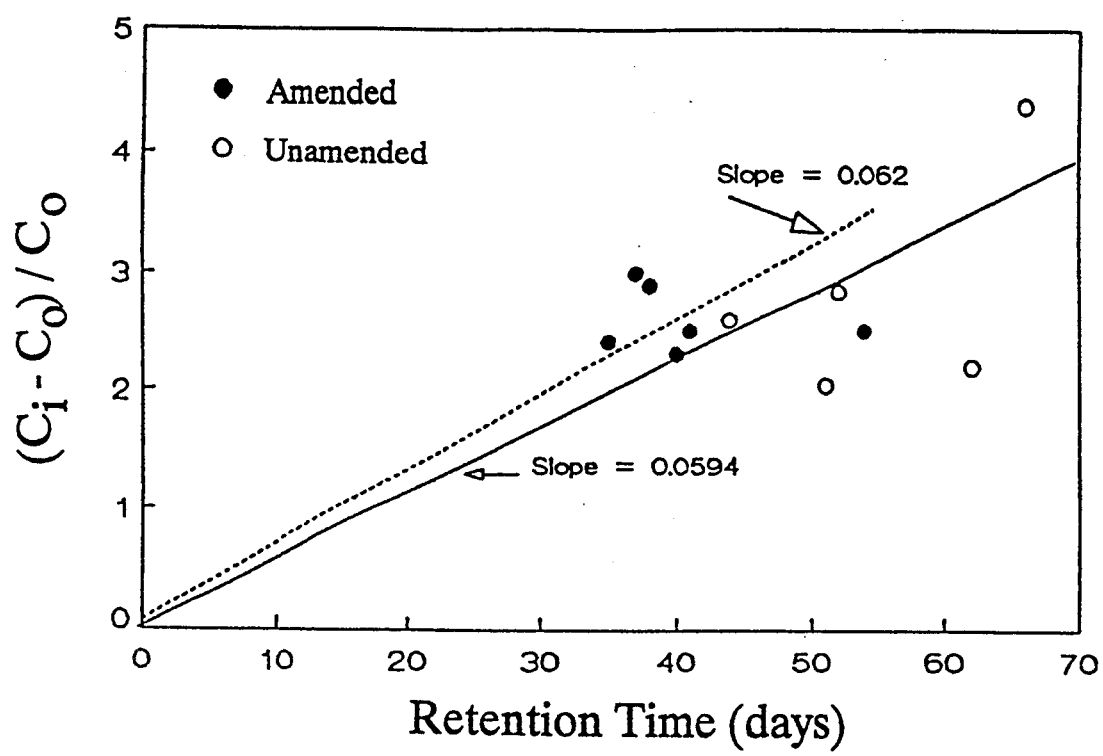
Figure 18. Reaction Rate Coefficient for Digester 1
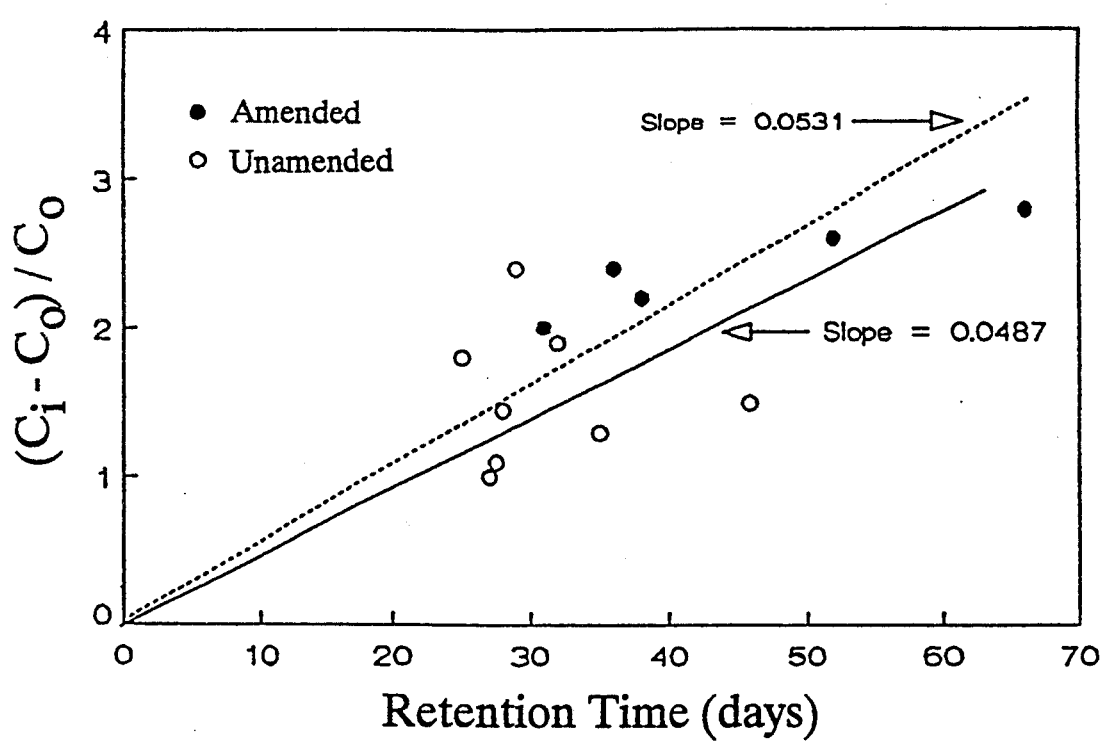
Figure 19. Reaction Rate Coefficient for Digester 2

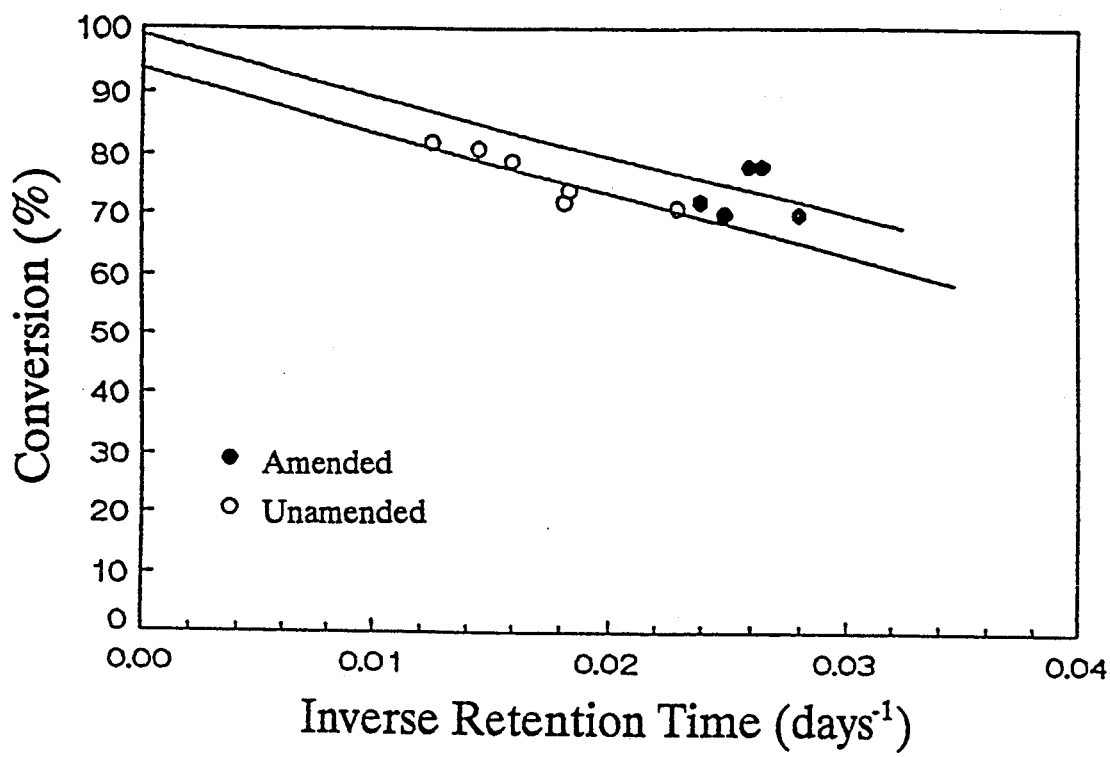
Figure 20. Conversion vs. Inverse Retention Time for Digester 1
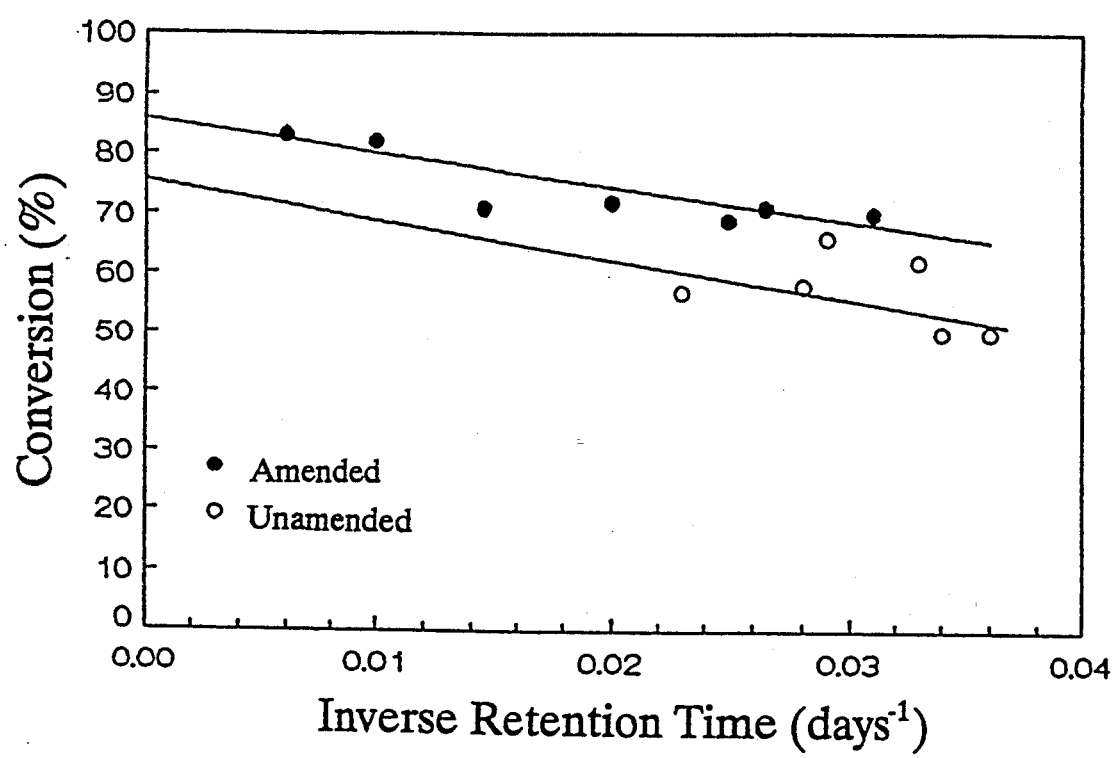
Figure 21. Conversion vs. Inverse Retention Time for Digester 2

PERFORMANCE OF ANAEROBIC DIGESTERS

FIELD OF THE INVENTION

The invention relates generally to anaerobic digestion processes for the treatment and stabilization of organic wastes and more specifically to methods of improving anaerobic digestion by enhancing the microorganism population through the creation of a nutrient environment more favorable for microbial growth and through the addition of microbes.

BACKGROUND AND INTRODUCTION TO THE INVENTION

Anaerobic digestion is a biological process which can be used to convert inexpensive, readily available and inexhaustable resources, notably sewage sludge, industrial and municipal waste and biomass material to valuable product gases, principally methane. Anaerobic digestion has been used commercially for the treatment and stabilization of organic wastes for a century. Almost every municipality disposes of most of its sewage sludge by anaerobic digestion. In addition, many industries treat solid and liquid waste streams in anaerobic treatment facilities. The process has advantages, not only in its suitability for treating wastes having a high water content or difficulties in incineration, but also facilitates the recovery of methane as a source of clean energy. A great deal of effort has gone into designing anaerobic digestion systems which operate reliably, efficiently and quickly. Among the designs developed for anaerobic digestion systems are the completely mixed reactor, the anaerobic contact process, the upflow and downflow packed bed reactors, the fluidized bed reactor, the upflow anaerobic sludge blanket, the baffled reactor, and various two stage processes. (The apparatus employed in carrying out the anaerobic digestion processes are referred to as reactors or digesters.)

All of these processes are dependent upon the same anaerobic microorganisms to perform the conversion of the organic matter to methane. While Applicant does not wish to be bound by any particular theory or hypothesis with regard to this discussion or any other throughout this application, anaerobic digestion of organic matter to methane and carbon dioxide is presently thought to occur in three stages, each of which involves a different type of bacteria.

The first stage of anaerobic digestion involves the fermentative bacteria. Fermentative bacteria hydrolyze the polymers of the primary substrates, such as polysaccharides, proteins and lipids, and ferment them to produce fatty acids (such as propionate and butyrate), organic acids, alcohols, ammonia, sulfide, $CO_2$ and $H_2$.

The second stage of anaerobic digestion is the degradation of the fatty acids, some organic acids and alcohols produced in the first stage. These compounds are degraded by a second group of bacteria called the obligate $H_2$-producing (i.e., proton-reducing) acetogenic bacteria. Only a few of these microorganisms have been isolated and studied. The products of the second stage degradation include acetic acid, $H_2$ and $CO_2$.

The third and final stage of anaerobic digestion involves the methanogenic bacteria. Some methanogenic bacteria cleave acetic acid to product $CO_2$ and $CH_4$. This reaction is very important because approximately 70% of the methane produced during anaerobic digestion is derived from the methyl group of acetic acid. Other methangenic bacteria utilize the $H_2$ produced by other microorganisms to reduce $CO_2$ and $CH_4$.

Depending on the content of the waste material fed into an anaerobic digester, different stages may be the rate-limiting step in the digestion process. In the digestion of soluble compounds, the rate-limiting step has been identified as the third stage or methanogenesis, and more specifically, the aceticlastic (uses acetic acid) methanogenic step. For the digestion of insoluble wastes, the hydrolysis of these materials, or the first stage of anaerobic digestion, may be the rate-limiting step.

Hydrogen, which is involved in many principal biological reactions, is recognized as being the controlling influence on the overall scheme of waste utilization. Hydrogen exerts control at certain points of anaerobic digestion.

Hydrogen plays an important role in regulating the proportions of the various products produced by the fermentative bacteria. During fermentation, $H_2$ is produced from electrons generated in the oxidation of reduced pyridine nucleotides:

$H_2$ formation is favored only when the partial pressure of $H_2$ is very low, as it is when $H_2$ is effectively metabolized by methanogens during the third stage of anaerobic digestion. At low partial pressures of $H_2$, the flow of electrons (NADH) generated during glycolysis is toward the reduction of protons, resulting in $H_2$ formation. The $H_2$ allows pyruvate to be degraded to acetate, $CO_2$ and $H_2$. When the partial pressure of $H_2$ is increased, the flow of electrons from NADH shifts from $H_2$ production to the formation of reduced electron sink fermentation products, such as propionate and longer-chained fatty acids, lactate or ethanol from pyruvate. Therefore, in ecosystems in which methanogens are effectively utilizing $H_2$, fermentative bacteria produce more acetate, $CO_2$ and $H_2$, but produce little or no ethanol or lactate and produce considerably less propionate and butyrate.

Hydrogen also exerts control during the process in which acetogenic bacteria act on fatty acids, organic acids and alcohols to produce acetic acid and hydrogen. The equilibrium reactions for the degradation of butyrate and propionate under standard conditions are:

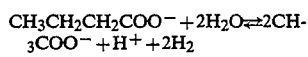

$\Delta G^{\circ\prime} + +48.1$ kJ/reaction $CH_3H_2COO^- + 3H_2O \rightleftharpoons CH_3COO^- + H^+ + 2H_2$ $\Delta G^{\circ\prime} = +76.1$ kJ/reaction As indicated by large positive values for $\Delta G^{\circ\prime}$, these reactions do not favor degradation. However, when the partial pressure of $H_2$ is maintained at a very low level in the digester, $H_2$ production from these compounds is thermodynamically favorable. For example, when the partial pressure of $H_2$ is decreased below 0.15 atm, the degradation of ethanol becomes energetically favorable. However, the degradation of butyrate or propionate is not energetically favorable until the partial pressure is lowered to about $2 \times 10^{-3}$ atm or $9 \times 10^{-3}$ atm, respectively. Thus, a slight increase in the partial pressure of $H_2$ will halt the degradation of these compounds, with propionate degradation being the first reaction to be inhibited. As expected, studies have shown that during digester failure, propionate is the first acid that accumulates.

Thus, as discussed above, the partial pressure of $H_2$ not only regulates the proportion of end products of the fermentative bacteria in stage one but also the degradation of these fermentation products by the $H_2$-producing acetogenic bacteria in stage two.

Methanogenic bacteria, in addition to producing gaseous fuel (methane) in stage three, can be used to maintain the $H_2$ concentration in the reactor at a very low level and thus allow the digestion of organic matter to proceed efficiently. Therefore, to obtain maximum performance from an anaerobic digester, the concentration of methanogens within the digester should be maximized. Several methods have been used to obtain high concentrations of bacterial biomass (including high concentrations of methanogens) in anaerobic digesters. These methods include: (1) the recycle of solids in the anaerobic contact process; (2) attachment of biomass to supports in fixed films and fluidized or expanded beds; and (3) formation of granular biomass in a sludge blanket. While these methods have been successful in achieving high bacterial concentrations, they do not increase th population of methanogens in proportion to the other bacteria. Hence, the $H_2$ partial pressures are not regulated in these systems and rates are not maximized.

The reaction kinetics of anaerobice digestion are quite slow. Reaction times of up to 30 days may be required to efficiently stabilize and reduce sludge volumes and/or reduce the Biological Oxygen Demand (BOD) to acceptable levels. In addition, the start-up of anaerobic digesters for sludge treatment is a slow and uncertain process. It may take several months after inoculation before a digester is operating at its desired capacity. In some cases, for example, in a very large fixed film reactor, it may take up to one year for the anaerobic biomass to develop sufficiently to attain maximum digestion efficiency.

Once a digester has achieved maximum efficiency, if the digester is shocked, for example, by shortening the retention time, overloading the system or adding a toxic substance, recovery can also be very slow. As anaerobic digestion is presently practiced, it may take several months to recover from the resulting lowered conversion efficiency or complete inhibition of conversion and regain the conversion efficiency which existed before the upset.

SUMMARY OF THE INVENTION

The present invention is directed to a method of improving anaerobic digestion by enhancing the microorganism population through the creation of a nutrient environment more favorable for microbial growth of methanogenic bacteria. Preferred techniques for increasing the concentration of methanogens in anaerobic digester sludge include the addition of chelating agents to the sludge, in order to increase the solubility of inorganic nutrients, and the addition of chelating agents along with selected inorganic nutrients. The present invention is also directed toward methods of methanogen addition which not only substantially enhance the rate of anaerobic digestion, but also aid in smooth and rapid digester start-up, as well as recovery after upset.

BRIEF DESCRIPTION OF THE DRAWINGS

FIG. 1 shows methane production of methanogenic bacteria as a function of time for control and nitrilotriacetate (NTA) addition.

FIG. 2 shows methane production of methanogenic bacteria as a function of time for control and methanogen (*Methanosarcina barkeri*) amended culture.

FIG. 3 is an illustration of the laboratory reactor used for continuous culture experiments.

FIG. 4 shows cumulative gas production of methanogenic bacteria as a function of time for control and methanogen (*Methanosarcina barkeri*) amended reactors.

FIG. 5 shows cumulative gas production during recovery of upset digesters. Cumulative gas production (L[stp]) is shown as a function of time for control and *Methanosarcina barkeri* (MB) amended reactors.

FIG. 6 shows gas production improvement with ethylenediamine tetra-acetic acid (EDTA) amendment. The percent improvement in gas production is shown as a function of dosage of EDTA.

FIG. 7 shows gas production improvement with citric acid (CA) amendment. The percent improvement in gas production is shown as a function of dosage of CA.

FIG. 8 shows the average gas production improvement for chelating agent amendment, i.e., the average improvement for amendment with EDTA or CA. The percent improvement in gas production is shown as a function of dosage of chelating agent.

FIG. 9 shows average gas production and improvement as a function of retention time. The percent improvement in gas production (left-hand y-axis) and average gas production (right-hand y-axis) are shown as a function of retention time in days.

FIG. 10 shows projected annual savings for EDTA amendment. Annual savings (in $1,000/year) is shown as a function of dosage of EDTA.

FIG. 11 shows annual savings for CA amendment. Annual savings (in $1,000/year) is shown as a function of dosage of CA.

FIG. 12 shows gas production of the control reactor in the 1 g/L methanogen test.

FIG. 13 shows gas production of 1 g/L methanogen amended reactor.

FIG. 14 shows gas production of control reactor in 2 g/L methanogen test.

FIG. 15 shows gas production of 2 g/L methanogen amended rector.

FIG. 16 shows gas production of control reactor in upset and 3 g/L test.

FIG. 17 shows gas production of upset and 3 g/L amended reactor.

FIG. 18 shows the reaction rate coefficient for digester 1.

FIG. 19 shows the reaction rate coefficient for digester 2.

FIG. 20 shows percent conversion as a function of inverse retention time for digeser 1.

FIG. 21 shows percent conversion as a function of inverse retention time for digester 2.

DETAILED DESCRIPTION OF THE INVENTION

Addition of Chelating Agents Alone

Methanogenic bacteria require iron, cobalt, nickel and molybdenum for growth and methanogenesis. Although these trace metals may be found in most digesters in sufficient quantity to allow growth of methanogens, they may be precipitated and/or complexed with other elements, thus making them unavailable for uptake by methanogenic bacteria.

The present invention provides methods for increasing the availability of these trace metals to methanogenic bacteria by solubilizing the trace metals. Preferably, the trace metals are solubilized by the addition of chelating agents. A partial list of chelating agents and their stability constants is given in Table 1. For the chelating agents listed in Table 1, the affinity is generally greatest for $Fe^{3+}$ and least for calcium and magnesium. The degree of binding of iron depends on whether it is present in ferric ($Fe^{3+}$) or ferrous ($Fe^{2+}$) form. In addition, agents which form lipophilic complexes, for example, EDDHA and 8-hydroxyquinoline, may permeate the plasma membrane of an organism and assist in the uptake of metal ions.

This represents a rate increase of 40 percent. In the NTA experiment, the methane production rate improved from 1.23 ml/day to 1.52 ml/day with NTA addition, which represents a 23 percent increase after 15 days.

Applicant also found that the addition of chelating agents resulted in a substantial increase in the destruction of solids. See Tables 3, 5, 7 and 9.

In summary, the results of the experiments described in Example 1 show that methane production and solids destruction are stimulated by the addition of chelating agents. Moreover, the production tends to increase with increasing concentrations of NTA, EDTA, and CA. The rate of production is also stimulated, showing a definitive improvement after one day and significantly faster rates during the 15 days.

The stimulation effect is much more pronounced for NTA than for the other chelating agents. For example, methane production is increased by about 20 percent

TABLE 1

Stability constants of some chelating agents of importance in culture media

| Chelating agent | Log stability constant ||||||||
|---|---|---|---|---|---|---|---|---|
| | $Fe^{3+}$ | $Cu^{2+}$ | $Zn^{2+}$ | $Co^{2+}$ | $Fe^{2+}$ | $Mn^{2+}$ | $Ca^{2+}$ | $Mg^{2+}$ |
| EDDHA[2] | 33.9 | 15 | 9.3 | — | 14.3 | — | 7.2 | 2.9 |
| CDTA[1] | 27.5 | 21.3 | 18.5 | 18.9 | 16.3 | 14.7 | 12.5 | 10.3 |
| EDTA[1] | 25.1 | 18.3 | 16.3 | 16.2 | 14.3 | 13.6 | 10.7 | 8.7 |
| NTA[1] | 15.9 | 12.8 | 10.5 | 10.6 | 8.8 | 7.4 | 6.4 | 7.0 |
| Histidine[1] | — | 18.3* | 12.9* | 13.9* | 9.3* | 7.7* | — | — |
| 8 Hydroxyquinoline | 26.3* | 25.4* | 17.1* | 19.5* | 15.0* | 13.5* | 13.2* | 12.0* |
| 1:10 Phenanthroline | 14.1* | 18.0 | 17.0* | — | 21.0* | 7.4* | — | — |
| 2:2′ Dipyridyl | — | 17.9+ | 13.5+ | — | 17.6+ | 6.3+ | — | — |
| SSA | 14.1 | 9.4 | — | 6.5 | — | 5.3 | — | — |
| Glycine[1] | —. | 15.2* | 9.5* | 8.9* | 7.8* | 4.7* | — | — |
| Citric acid[1] | 11.4 | 5.9 | 5.0 | 5.0 | 4.4 | 3.7 | 3.6 | 3.3 |
| Polyphosphate | 6.5* | 5.5* | 6.0* | 3.0 | 3.0 | 5.5* | 3.0 | 3.2 |

EDDHA = ethylenedinitrilo-N,N'-bis(2'hydroxyphenyl)-N,N'-diacetic acid
CDTA = 1:2 diaminocyclohexane-N,N-tetra-acetic acid
EDTA = ethylenediamine tetra-acetic acid
NTA = nitrilotri-acetic acid
polyphosphate = $[P_nO_{3n+1}]^{(n+2)-}$ where $n \approx 5$
SSA = 5-sulphosalicylic acid
The stability constant is K = [ML]/[M][L] where [ML], [M] and [L] are the concentrations of complex, free metal ion and free ligand respectively
*Stability constant is $\beta_2$ = $[ML_2]/[M][L]^2$, which is obtained from the equilibrium $M + 2L \rightleftharpoons ML_2$
+Stability constant is $\beta_3$ = $[ML_3]/[M][L]^3$, which is obtained from the equilibrium $M + 3L \rightleftharpoons ML_3$ Applicant has discovered that the addition of certain chelating agents to an anaerobic digestion system results in increased production of methane, as well as increased destruction of solids. The results of Applicant's experiments examining effect of addition of chelating agents on the growth of methanogenic bacteria are described in Example 1. Four chelating agents were utilized: 1:2 diamino cyclohexane-N,N-tetra acetic acid (CDTA), nitrilotriacetate (NTA), ethylenediamine tetra-acetic acid (EDTA), and citric acid (CA).

Applicant found that in all cases in which chelating agents were added, methane production increased. As shown in Tables 4, 6, 8 and 10, the increase varied from 5 to 20 percent, depending on the chelating agent added, with NTA addition resulting in a 20 percent improvement. The results of the NTA experiments, which are shown graphically as a function of time in FIG. 1, demonstrate that methane production is consistently higher than the control and the improvement over control increases with time.

Applicant further discovered that the rate of methane production is enhanced with the addition of chelating agents. For example, in the EDTA experiment, at 9 days the EDTA culture had produced $6.1 \times 10^{-3}$ gmol/L of methane. By contrast, it took 15 days for the control culture to produce this quantity of methane.

after 15 days. This magnitude of increased methane production shows that the chelating compound is not simply serving as an additional carbon source for methane production. The theoretical conversion of 1 uM of NTA into methane is about 4.5 micromoles of methane. However, the 1 uM experiment shows an increase in methane production of about 500 micromoles over the control. Therefore, the 100-fold increase in methane production could not be due to metabolism of NTA to methane. Applicant believes the stimulation results from the chelating agent's ability to increase the solubility of essential inorganic nutrients which promote the growth and stability of the methanogenic population.

Thus, Applicant has demonstrated that, by the addition of relatively small amounts of chelating agents, methane production from anaerobic digesters can be increased or, alternatively, smaller digesters can be used to achieve the same methane production. Also, faster digester start-up, greater digester stability and more rapid digester recovery from upsets should result from the addition of chelating agents.

Addition of Nutrients Alone

Iron, sulfide, selenium and nickel are required by methanogenic bacteria for growth and methanogenesis, i.e., the production of methane. Iron and sulfide are particularly important to the rapid development of the bacteria. For example, when *Methanobacterium bryantii* strain M.o.H., which utilizes $H_2$ and $CO_2$ to produce methane, is grown with only 0.007 g/l $FeSO_4.7H_2O$, its generation time is in excess of 30 hours. However, when the $FeSO_4.7H_2O$ is increased to 0.01 g/l, as was used in generating the data in Table 2, the generation time is decreased to 6 hours.

Table 2 also shows that the growth rates for a wide number of methanogens are quite slow and limit the retention times at which most anaerobic digesters can operate. Consequently, anaerobic digesters operate at lenthy retention times to maintain bacterial growth and an adequate methanogen population. Therefore, substantial opportunity for improvement is possible.

The data in Table 2 were obtained under a $H_2:CO_2$ atmosphere with 2.5 percent sodium acetate as a cell carbon source, 0.125 percent cysteine (added as a reducing agent) and trace vitamins being the only organic constituents of the medium. When organics such as trypticase and yeast extract are added, the generation time is somewhat shortened.

To further illustrate the importance of iron in the growth of methanogens, Table 2 shows growth data for *Methanogenium olentangyi, Methanococcus deltas* and *Methanospirillum hungatei*. These organisms would not grow at all unless the iron concentration were at least 0.01 g/l.

Applicant theorized that the potential existed to reduce the retention time and to enhance the growth and numbers of methanogens in anaerobic digesters, given the proper nutrient environment within the reactor.

TABLE 2

Growth Characteristics of Fourteen Methanogens

| Organism | $g(h)^a$ | Max O.D. 580 nm | $Y_{methane}^b$ |
|---|---|---|---|
| Methanobrevibacter smithii PS | 10.0 | 1.1 ± .06 | 1.08 ± .06 |
| Methanobacterium thermoautotrophicum H | 1.6 | 1.1 ± 14 | 0.73 ± .09 |
| Methanobacterium thermoautotrophicum RC | 3.0 | 1.0 ± .06 | 0.78 ± .11 |
| Methanobacterium formicicum MF1 | 6.0 | 1.2 ± .06 | 1.07 ± 04 |
| Methanobacterium formicicum RC | 3.8 | 1.3 ± 12 | 1.15 ± .05 |
| Methanosarcina barkeri MS | 7.0 | N.D.$^c$ | 2.14 ± .24 |
| Methanosarcina barkeri 227 | 7.6 | N.D. | 2.27 ± .14 |
| Methanococcus vannielii | 16.0 | 0.7 ± .03 | 1.60 ± .11 |
| Methanospirillum hungatei JF | 13.0 | 0.8 ± .05 | 0.84 ± .12 |
| Methanococcus maripaludis | 3.0 | 0.9 ± .02 | 1.47 ± .04 |
| Methanobacterium bryantii M.o.H. | 6.0 | 1.0 ± .1 | 1.30 ± .09 |
| Methanobacterium olentangyi | 11.0 | 0.9 ± .01 | 1.06 ± .04 |
| Methanococcus deltae | 2.0 | 0.9 ± .07 | 1.41 ± .19 |
| Cuyahoga River coccus | 11.6 | 0.9 ± .03 | 1.01 ± .03 |

$^a$g(h) indicates generation time in hours.
$^b Y_{methane}$ equals the gram dry weight of cells per mole of methane produced.
$^c$N.D. not determined.

The availability of sulfide is also of great importance to the growth of methanogens. Sulfide is a required nutrient for all methanogens and is critical to the aceticlastic methanogen *Methanosarcina barkeri*. It is necessary to balance the addition of trace metals and sulfide which, if added in excess, may precipitate as salts and cause sulfide to be unavailable to methanogens for uptake.

The importance of nickel and selenium to stimulate the growth of methanogens has also been recognized.

Applicant conducted experiments to determine the effect of addition of trace quantities of inorganic nutrients as described in Example 2. The inorganic nutrients utilized were nickel in the form of $NiCl_2$, iron in the form of $FeSO_4$ and $FeCl_2$, and selenium as $SeO_2$. Tables 11-18 present the data for the cultures with added nutrients. These data are presented on the same basis as for the chelating studies.

Applicant demonstrated that, in all cases, the volatile solids destruction was reduced and methane production was either unaffected or impaired by the addition of nutrients. In no case was the methane production enhanced. Significant suppression did not result for nutrient concentrations of 100 uM or less. Methane production was repressed 5-8 percent at the 1000 uM concentration.

The data are quite conclusive. Addition of excess nutrients in the form of $NiCl_2$, $FeSO_4$, $FeCl_2$, or $SeO_2$ did not improve methane production and actually repressed methane production at high nutrient concentrations. A possible explanation is that these metals may be complexing with sulfide in the sludge to form insoluble sulfides. Evidence of precipitated sulfides (dark color) was apparent in those experiments with added nutrients. Sulfide is an extremely important nutrient for the organisms involved in an anaerobic digestion culture. The effect of precipitating insoluble sulfides is to reduce the availability of free sulfide to the microorganisms, such that sulfide becomes limiting. When sulfide is limiting, the culture becomes inefficient in producing methane, even when other nutrients are present in excess.

Addition of Chelating Agents and Inorganic Nutrients

Applicant-conducted experiments to determine the effect of adding inorganic nutrients with chelating compounds to an anaerobic digestion culture. In these experiments, described in Example 3, the nutrient $FeSO_4$ was added alone or along with either chelator CA or CDTA.

Tables 19 and 20 show the results obtained for the addition of 1000 uM $FeSO_4$ alone and with 20 uM CA or CDTA. As before, the addition of nutrient only resulted in suppression of the methane formation and reduction of volatile solids destruction. However, unexpectedly, the addition of a small quantity of chelating compound with $FeSO_4$ resulted in increased methane production over the control. It appears that the chelated iron did not precipitate other essential nutrients and thus allowed them, as well as the iron, to remain available for microorganism growth. The greater effectiveness of CDTA over CA can probably be attributed to its higher log stability coefficient for $Fe^{2+}$ (16.3 vs. 4.4).

Addition of Methanogens

As discussed above, the methanogens can function to keep the hydrogen concentration within a reactor very low, allowing the fermentative bacteria to produce a large percentage of acetate and $H_2:CO_2$, and a low percentage of propionate, lactate, methanol and butyrate. A low hydrogen concentration also enables the obligate proton-reducing acetogens to convert butyrate and propionate to acetate, $H_2$, and $CO_2$.

Applicant has demonstrated that the addition of methanogens to a reactor substantially enhances the rate of anaerobic digestion. Applicant has also demonstrated that the addition of small numbers of methanogens to a stressed reactor balances the fermentation and allows rapid recovery. Additionally, Applicant has shown that added methanogens shorten digester start-up time and serve to establish methanogens in high numbers to handle the products of the fermentative and acetogenic bacteria. The methods used to evaluate the effect of addition of methanogens on digester performance are described in Examples 4–10.

Initially, batch experiments were carried out as described in Example 4. In these experiments, pure cultures of methanogens grown in a mineral salts medium without rich organics were used for injection into bottles of sludge. The following methanogens were used:

*Methanosarcina barkeri* (MB)
*Methanobrevibacter smithii* (MS)
*Methanobacterium formicium* (MF)

The results of Applicant's studies on the addition of these three methanogens to batch cultures in various combinations are given in Tables 21 and 22. In all cases, the addition of methanogens resulted in an increase in solids destruction and an increase in methane production. This supports the theory that methanogens reduce the $H_2$ concentration with a resultant improvement in efficiency.

The most significant improvement was for *Methanosarcina barkeri* (MB) which yielded an overall 11 percent increase in methane generation after 18 days. The MB-amended sludge showed a 28 percent increase in methane production over the control in only one day. These results are shown graphically in FIG. 2. For the MB culture, the rate of methane production increased dramatically for the first five days, after which the rate of improvement became less pronounced. The amended culture sustained the higher level of production and continued to improve over the duration of the experiment. The MB is the only methanogen tested capable of aceticlastic methanogenesis (as well as $H_2$:$CO_2$ reductive methanogenesis). However, Applicant's hypothesize that the major reason for its superior performance may be due to a higher cell concentration, rather than its ability to perform aceticlastic methanogenesis, because it grew to higher cell densities than did the other methanogens.

By these experiments, Applicant confirmed that methanogenesis is the rate limiting step in sludge digestion. Applicant showed that reactors amended with pure cultures of methanogens could produce higher quantities of methane and reduce sludge disposal volumes proportionately. In addition, Applicant showed that the addition of methanogens could facilitate start-up of digesters and recovery from upsets.

The performance of an anaerobic digestion culture can be best evaluated under continuous operation, rather than by batch experiments. Under continuous operation, the microorganism population reaches a stable concentration. At this point, the effect of amendments (e.g., addition of methanogens) can be more accurately measured. Also, continuous operation more nearly mimics industrial applications.

Semi-continuous reactors, as described in Example 5 and illustrated in FIG. 3, were used to evaluate the enhancement of a digester start-up with the addition of methanogens. The results of the experiments are given in Table 23. Weekly gas productions at Standard Temperature and Pressure (STP) are given for the four-week operating period. Methane concentrations ranged from 55–65 percent of total gas produced. Applicant discovered that the amended culture consistently produced from 10–30 percent more gas than the control. These results are shown graphically in FIG. 4, where the cumulative gas production is plotted as a function of time. The MB-amended culture produced an average of 24 percent more methane than the control. This improvement would be expected to be even greater if the retention time were longer.

As discussed above, once an anaerobic digester has achieved optimal efficiency, if it is shocked, such as by overload of the system, addition of a toxic substance, or shortening of retention time, recovery can be very slow. Applicant performed experiments to determine whether added methanogens could stimulate recovery of a shocked digester. The experiments are described in Example 6.

An upset digester was simulated by pH adjustment to cause inhibition of digestion. The methanogens were then added to the reactor to determine the stimulation from recovery. A control consisted of an uninoculated sludge reactor which was not upset. The same six parameters as were followed in the start-up experiments described in Example 5 were followed here as well.

Applicant has shown that the addition of methanogens substantially enhances the recovery of a shocked anaerobic digester. Such upsets are not uncommon in practice, thus, this type of amendment has significant potential for commercial application. Perhaps more significant is the showing in FIG. 5 that the rate of gas production was increasing faster after two weeks in the digester with amendment than in the control reactor. This result again indicates that a significant improvement in operation and gas production might be achieved on a continuous basis.

In summary, Applicant's experiments demonstrated that the addition of pure methanogens to anaerobic digestion cultures enhanced the methane production by 11 percent in a batch culture, 24 percent in a continuous reactor after start-up and nearly double during recovery from an upset. Because methane production is considered to be the rate limiting step in sludge digestion, some enhancement in the kinetics was to be expected. However, the magnitude and duration of the enhancement demonstrated in the continuous experiments was not expected. These data indicate that a substantial permanent enhancement can be achieved with the addition of small quantities of methanogens.

Chelation Optimizing Experiments

To confirm that the results of the batch chelation experiments would be applicable to commercial anaerobic digesters, which are operated semi-continuously, Applicant conducted additional continuous experiments.

These experiments under continuous culture conditions also served to determine the optimal levels and schedule of chelating agents to be added to anaerobic digesters to maximize methane production and sludge destruction. The experiments are described in Example 7 and the results of Applicant's studies to determine optimal dosages of chelating agents are summarized in Table 25 and FIGS. 6–9.

These data show that substantial improvements are possible at the usual operating conditions and indicate that low dosages of chelating agents may be optimal. As shown in FIG. 6 and 7, respectively, the improvement in gas production vs. dosage of EDTA and CA is more sensitive to the retention time than to the chelating agent concentration. The longer the retention time, the greater the improvement in gas production. The results indicate that at low retention time (high flow rates), there are adequate dissolved nutrients to support microbial gorwth. However, at longer retention times, the available nutrients are insufficient to support maximum growth without the addition of chelating agents.

As shown in FIG. 8, the optimal improvement in methane (gas) production is achieved with a 10 uM dosage of chelating agent. Although some enhancement is obtained by using dosages above 10 uM, the additional improvement is only about 3 percent per 100 uM.

As noted above, the improvement in gas production is sensitive to the retention time. In fact, as can be seen from FIG. 9, the improvement is proportional to the retention time. FIG. 9 show data for retention times of 10, 15 and 25 days. However, because most commercial reactors operate at retention times of 25 days or longer, the possibility for even greater enhancement of gas production exists.

The selection of the optimal chelator and dosage can be based simply on the annual savings from addition of the amendment. One such analysis is described in Example 8. FIGS. 10 and 11 show the net benefit of the EDTA and CA amendment at different retention times. Since the unit cost of EDTA is less than half that of CA, the influence of the dosage to the net benefit was quite different with these two chelating agents. The low cost of EDTA makes the amendment under higher dosages advantageous. However, low dosage amendment is more attractive in the case of CA. The optimal condition is 500 uM dosage of EDTA at a 15 day retention time, which results in an annual savings of $15,000. However, the better choice in practice may be a 10 uM dosage at the same retention time, which results in $12,800/yr benefit with annual cost of EDTA of $88, instead of $4,108 with the 500 uM dosage. The best condition for the CA amendment is with 10 uM dosage at a 25-day retention time, which results in an $8,800/yr savings.

Extended Continuous Methanogen Experiments

Extended continuous methanogen experiments were conducted by Applicant to determine the level of enhancement of methanogen addition to operating digesters and to determine the effect of methanogen addition on recovery after upset.

As shown in Example 9, the improvement of 1 g/L *Methanosarcina barkeri* amendment at a 25-day retention time averaged 35% higher gas production over the control reactor for more than five months operation. This improvement appears to be permanent. The use of an additional 1 g/L amendment increased gas production to 59% over the control for another four-month operation period. Again, the improvement seems permanent at a 25-day retention time..

Applicant believes that these significant improvements are the result of the ability of *Methanosarcina barkeri* to consume both acetate and $H_2$. The $H_2$ partial pressure regulates the proportions of the various products from the fermentative bacteria in the first stage and controls the degradation of the fatty acids to acetate in the second stage. Thus, low $H_2$ pressures maintained by *Methanosarcina barkeri* improve the rates of these stages of the process.

Therefore, the addition of methanogens does improve the overall process rate, and suprisingly, the improvement is relatively large and permanent.

It has long been thought that in sludge digestion, the rate limiting step was methanogensis. The increased methanogen population functions to speed up the rate limiting step, as well as the other steps. However, Applicant found the increase to be nearly 60 percent at long retention times and lasted for nearly one year. Even greater improvement might result with an increased dosage.

The permanent effect might be explained by considering that a normal culture can only move to a higher methanogen population by an over-production of acetate as substrate for methanogen growth. An excess Amount of acetate would lower the pH and adversely affect methanogen performance and growth. Thus, a normal culture might never evolve to a higher methanogen population, given the many other variables that are changing. However, addition of methanogens would allow an increase in the acetate production to sustain the higher cell concentration.

As stated earlier, the significant improvement of the amended reactor is attributed to the ability of *Methanosarcina barkeri* to consume both acetate and $H_2$. Through the use of labeled acetic acid, it has been found that 73 percent of the methane produced in a standard anaerobic digester comes from acetate. Thus, the utilization of acetate by *Methanosarcina barkeri* plays an important role in the improvement. Furthermore, the bacteria are also responsible for maintaining the $H_2$ Concentration in the reactor at a very low level in order for the fermentation to proceed efficiently. Hydrogen is involved in many principal biological reactions and is recognized as being the controlling influence on the overall scheme of anaerobic digestion. Hydrogen exerts an important influence in controlling the proportion of products from the first stage of anaerobic digestion, as well as the degradation of these products in the second stage. Therefore, *Methanosarcina barkeri*, which uses both $H_2$ and acetate, enhances the fermentation by maintaining lower $H_2$ levels, as well as producing more gas from acetic acid.

To determine the ability of a reactor amended with methanogens to recover from an upset, an additional experiment was performed as described in Example 10. An imposed upset with sulfuric acid for one day inhibited the gas production in both control and amended reactors for three week. After the third week, 1 g/L more of methanogens was inoculated. The gas production from both reactors increased to about double the amount before the upset. This condition remained for two months before the control reactor returned to its normal performance. After such time, the improvement of the amended reactor was about 60% over the control.

Field Trails

To further demonstrate the commercial feasibility of the present methods for improving performance of anaerobic digesters, Applicant conducted field trials. The field experiments were conducted at the Springdale, Arkansas Waste Treatment Plant, which has two primary anaerobic digesters. The volumes of Digesters 1 and 2 are 683,300 and 767,162 gallons, respectively. There are no gas meters installed or any means of determining the gas production rates. Since gas measurement is not possible, improvement in performance was measured as increased solids destruction. The experiments, which are described in Example 11, were based on the amendment of 10 uM CA to one digester, while keeping another digester as the control.

The amendment of Digester 1 of the Springdale Waste Treatment plant with 10 uM CA resulted in improvement of the gas production by about 5%. However, the average temperature was reduced about 4.5°

F. during this test. Therefore, under normal conditions, the actual improvement might be much better.

A 10 uM C-A amendment of Digester 2 resulted in a 10% improvement.

Considerable variability in retention time, temperature, and sludge quality was encountered in these field experiments. Nevertheless, 5-10% improvements in reaction rates were observed with only 10 uM amendment.

Methanogen Production

Although the concentrations are small (1 g/L), large quantities of pure methanogenic bacteria will be required for amending commercial digesters. Experiments have been conducted to determine appropriate methods for growth and preservation of methanogens.

*Methanosarcina barkeri* was chosen for the studies of methanogen production, which are described in Example 12, because of its ability to utilize acetate and $H_2$ and because of the good results obtained in amending reactors with this organism. *Methanosarcina barkeri* grows on $H_2$-$CO_2$, CO, methanol, methaylamines and acetate. Growth of *Methanosarcina barkeri* on a mixture of methanol and acetate has been determined to be diauxic, methane being produced from methanol and acetate in sequence; in the presence of $H_2$—$CO_2$ and acetate, the former substrate has been shown to be preferentially used. The simultaneous use of $H_2$—$CO_2$ and methanol have been observed during growth of *Methanosarcina barkeri* with methanol contributing to greater methane production. It has been shown that methanol is used for methanogenesis at a rate five times that of other substrates and that methanol is readily converted to methane in the presence of $H_2$—$CO_2$, without a lag phase. The methane production is about the sum of the production from methanol and $H_2$—$CO_2$. Therefore, the supply of methanol under an atmosphere of $H_2$—$CO_2$ should provide for rapid production of cells. However, if acetate is not present when the *Methanosarcina barkeri* culture depletes $H_2$, these cultures may lose the ability to use acetate as the sole substrate. Therefore, acetate is also provided in the medium. The medium used is listed in Table 34.

Although methanol has been reported as the preferred carbon and energy source for the growth of *Methanosarcina barkeri*, the gas composition was also found to significantly influence the growth. Two batch experiments were conducted to identify the appropriate methanol and gas compositions. Rapid growth of *Methanosarcina barkeri* was obtained by using methanol as the major substrate in fed-batch operation. However, 80% $H_2$ and 20% $CO_2$ gas is also required to support this rapid growth rate. The growth is inhibited when the methanol concentration is higher than 1.2%.

The supply of $H_2$—$CO_2$ gas was found to influence the growth rate. If the gas is supplied too often, a faster initial growth rate results, but cannot be sustained. If the gas is supplied too slowly, growth is impaired and methanol inhibition results. Thus, the supply of the gas should be precisely controlled.

The best production condition in batch culture was found to be provision of 1% methanol every two days, with the addition of 20 psig 80% $H_2$ and 20% $CO_2$ every two days. The maximum wet cell concentrations were 19.25, 35.0, 38.71, 40.41, and 43.75 g/L after 3, 6, 9, 12, and 15 days production, respectively. Further improvement of these results should be possible by close control of the methanol concentration. The concentration of the initial inocula can also be increased for more rapid growth. Production should be easily improved to 40 g/L within one week.

As noted above, both the methanol addition and the interval of $H_2$ and $CO_2$ re-pressurization were important factors in the growth of *Methanosarcina barkeri*. However, the addition of the methanogen medium or concentrated medium had no significant effect. Generally, methanol addition at the rates of 0.6% per day or 1.0% every two days gave the best results. The best interval for $H_2$ and $CO_2$ re-pressurization was every two days. While re-pressurization every day helped the cell growth in the initial stage, high growth rates were not sustained. Since $H_2$ and $CO_2$ are also carbon and energy sources, there is competition between these gases and methanol. When the gas is over-supplied, as in the case of re-pressurization every day, the methanol consumption is reduced and methanol concentrations accumulate. When inhibition levels are reached, the growth stops. On the other hand, if the supply of gases is not enough as with re-pressurization every three days, insufficient growth occurred, and methanol accumulated and stopped growth. With $H_2$ and $CO_2$ addition every two days, and 0.6% per day methanol addition, a cell concentration of 30 g/L was reached after six days of fermentation. The maximum cell concentration achieved was 38 g/L after 15 days by the addition of 1% methanol every two days. The limitation of cell concentrations to these levels could be caused by methanol accumulation, lack of some critical nutrient, or cell age or density limitations.

It has been reported that an excess of $H_2$ inhibits methanogenesis from methanol. In the current experiment, the 80% $H_2$ and 20% $CO_2$ gas composition used was controlled by the flow from two gas cylinders. The gas controls may not have been accurate and an excess of $H_2$ was possible. The use of a custom graded 80% $H_2$ and 20% $CO_2$ gas cyliner gave better results than the flow controlled mixing. Further studies examined the effect of adding 1.0% methanol every two days with gas addition every two days, adding 0.4% and no methanol every day with re-pressurization every day, and addition of 0.3 ml of 10% yeast extract at day 9. These results are given in Table 40. The best result found previously was a cell concentration of 38.5% g/L at day 15. With the premixed gas cylinder, the growth was improved to 43.75 g/L at day 15. The cell concentration was 38.7 g/L at day 9, before addition of the yeast extract.

For the 0.4% and no methanol addition, the cell growth was faster than with flow controlled mixing of the gas. However, lower cell concentrations resulted from these conditions. The cell growth was significantly stimulated by yeast extract in the 0.4% methanol experiment. However, no significant stimulation resulted in the 1% methanol case. The conclusion of these experiments is that rapid cell growth can be achieved in semi-batch culture by adding 1% methanol and 20 psig $H_2$—$CO_2$ every two days. It is also concluded that methanogen production can be improved by the provision of 0 to 1.2% by volume methanol in the liquid phase and 80% $H_2$ and 20% $CO_2$ by volume in the gas phase. These conditions provide the basis for potential large scale production.

Methanogen Preservation

If methanogen amendment of anaerobic digesters is to be practiced commercially, methods for storage and shipment of methanogens must be developed. The viability of methanogens stored with different preservation methods was investigated.

Applicant's experiments, which are described in Example 13, demonstrated that both freeze-drying to at least minus 40° C. and ultra-freezing to at least minus 70° C. can be used for the preservation of methanogens. After three months storage, the methanogens preserved by freeze-drying with 24% sucrose or 20% skim milk (as cryoprotection) and by ultra-freezing with 5% DMSO or 10% glycerol (as cryoprotection) or with no cryoprotection all reached the viability of unpreserved methanogens. However, based on the time required to reach unpreserved viability, the preferable preservation method is ultra-freezing with 5% DMSO.

EXAMPLES

The following examples are set forth to assist in understanding the invention and should not, of course, be construed as specifically limiting the invention described and claimed herein. Such variations of the invention as would be within the purview of those skilled in the art, including the substituion of equivalents now known or later developed, are to be considered to fall within the scope of the invention as hereinafter claimed.

EXAMPLE 1

ADDITION OF CHELATING AGENTS—BATCH EXPERIMENTS

Anaerobic sludge was obtained from a local municipal waste water treatment plant. A 29 ml aliquot was anaerobically dispensed into 125 ml crimp seal serum bottles. Flanged thick butyl rubber stoppers held in place by aluminum crimp seals were used to insure anaerobic conditions and prevent gas leaks. The chelators to be tested were made up in anaerobic solutions and injected by syringe into the bottles. The following chelating agents were tested in concentrations of 1 uM, 10 uM, 100 uM and 1000 uM:
1. Nitrilotriacetate (NTA)
2. Ethylenediamine tetraacetic acid (EDTA)
3. Citric acid (CA)
4. 1:2 diamino cyclohexane -N, -N-tetraacetic acid (CDTA)

These agents have log stability constants for $Fe^{3+}$ ranging from 27.5 for CDTA to 11.4 for citric acid. Effectiveness may vary between agents. Even though the chelating agent binds a trace metal strongly, it may still be available to the methanogen by virtue of being in solution.

The following parameters were followed as a function of time for 15 days:
1) gas volume production
2) methane production
3) carbon dioxide production
4) PH—initial and final
5) Volatile solids—initial and final
6) Volatile fatty acids—initial and final Control samples with no additions, and samples with varying concentrations of chelating agents were run in triplicate. The results for the CDTA, NTA, EDTA, and CA experiments are given in Tables 3–10. Tables 3, 5, 7, and 9 show the initial and final (after 15 days) concentrations of total solids, volatile solids, and ash, as well as the total volume of gas produced for each of the concentration levels utilized. The characteristics of the beginning sludge inoculum are given in the first row for each experiment. Volatile fatty acids were also measured but were present in insignificant concentrations in all experiments. Tables 4, 6, 8, and 10 give the methane production from the time of inoculation for the various chelating agents and concentrations. These methane quantities appear small but are normal considering the low substrate concentration. These values are presented as the methane concentrations in the gas space of the serum bottle, and an increase in concentration, of course, denotes an increase in methane production. The concentration of $CO_2$ was not measured daily, but when measured showed that the gas produced was 55–70 percent methane.

TABLE 3

Results of CDTA Amended Cultures
(after 15 days - all data are average of 3 replicates)

| Amend-ment | pH | Dry Solids g/L | Ash g/L | Volatile Solids g/L | Gas Production (ml) | | |
|---|---|---|---|---|---|---|---|
| | | | | | Measured | Calculated V.S. | Methane |
| Beginning | 7.2 | 9.127 | 2.932 | 6.195 | 0 | 0 | 0 |
| Control | 7.1 | 7.276 | 2.780 | 4.496 | 35.5 | 28.3 | 24.8 |
| 1 uM | 7.8 | 7.208 | 2.748 | 4.460 | 36.2 | 43.6 | 26.3 |
| 10 uM | 7.7 | 7.132 | 2.688 | 4.444 | 40.0 | 44.0 | 27.5 |
| 100 uM | 7.7 | 7.132 | 2.708 | 4.424 | 31.7 | 44.6 | 27.6 |
| 1000 uM | 7.7 | 7.260 | 2.636 | 4.624 | 32.7 | 38.9 | 26.5 |

TABLE 4

Methane Production from CDTA Amended Cultures

| | Methane Production ($10^{-3}$ mole/L) Day | | | |
|---|---|---|---|---|
| Amendment | 4 | 6 | 9 | 15 |
| Control | 2.2 | 3.9 | 5.1 | 5.0 |
| 1 uM | 2.3 | 4.2 | 5.1 | 5.0 |
| 10 uM | 2.7 | 4.3 | 5.1 | 5.2 |
| 100 uM | 2.3 | 4.1 | 5.1 | 5.2 |
| 1000 uM | 2.5 | 4.3 | 5.2 | 5.2 |

TABLE 5

Results of NTA Amended Cultures
(after 15 days - all data are average of 3 replicates)

| Amend-ment | pH | Dry Solids g/L | Ash g/L | Volatile Solids g/L | Gas Production (ml) | | |
|---|---|---|---|---|---|---|---|
| | | | | | Measured | Calculated V.S. | Methane |
| Beginning | 7.60 | 7.312 | 2.499 | 4.813 | 0 | 0 | 0 |
| Control | 7.68 | 6.607 | 2.447 | 4.160 | 22.7 | 14.0 | 28.6 |
| 1 uM | 7.61 | 6.304 | 2.300 | 4.004 | 24.7 | 18.48 | 31.9 |
| 10 uM | 7.67 | 6.318 | 2.300 | 4.018 | 24.7 | 18.09 | 32.2 |
| 100 uM | 7.67 | 6.397 | 2.343 | 4.054 | 25.6 | 17.06 | 32.8 |
| 1000 uM | 7.68 | 6.291 | 2.421 | 3.870 | 27.5 | 22.30 | 36.6 |

TABLE 6

Methane Production from NTA Amended Cultures

| | Methane Production ($10^{-3}$ mole/L) Day | | | |
|---|---|---|---|---|
| Amendment | 4 | 6 | 9 | 15 |
| Control | 2.1 | 4.2 | 4.6 | 6.9 |
| 1 uM | 2.2 | 4.3 | 4.7 | 7.4 |
| 10 uM | 2.3 | 4.4 | 4.8 | 7.5 |
| 100 uM | 2.3 | 4.4 | 4.9 | 7.7 |
| 1000 uM | 2.4 | 4.5 | 5.0 | 8.2 |

TABLE 7

Results of EDTA Amended Cultures
(after 15 days - all data are average of 3 replicates)

| Amendment | pH | Dry Solids g/L | Ash g/L | Volatile Solids g/L | Gas Production ml |
|---|---|---|---|---|---|
| Control | 7.45 | 7.284 | 2.565 | 4.719 | 76.7 |
| 1 uM | 7.40 | 7.342 | 2.577 | 4.765 | 70.0 |
| 10 uM | 7.40 | 7.265 | 2.539 | 4.726 | 70.0 |
| 100 uM | 7.37 | 7.363 | 2.588 | 4.775 | 69.3 |
| 1000 uM | 7.35 | 7.575 | 2.860 | 4.715 | 77.7 |

TABLE 8

Methane Production from EDTA Amended Cultures

| | Methane Production ($10^{-3}$ g mole/L) Day | | | |
|---|---|---|---|---|
| Amendment | 4 | 6 | 9 | 15 |
| Control | 5.4 | 6.1 | 14.4 | 16.1 |
| 1 uM | 5.5 | 6.2 | 15.2 | 16.3 |
| 10 uM | 5.6 | 6.5 | 15.7 | 16.5 |
| 100 uM | 5.8 | 6.8 | 15.9 | 16.7 |
| 1000 uM | 5.6 | 10.6 | 16.3 | 16.7 |

TABLE 9

Results of CA Amended Cultures
(after 15 days - all data are average of 3 replicates)

| Amendment | pH | Dry Solids g/L | Ash g/L | Volatile Solids g/L | Gas Production (ml) Measured | Calculated V.S. | Calculated Methane |
|---|---|---|---|---|---|---|---|
| Beginning | 7.54 | 10.905 | 3.189 | 7.716 | 0 | 0 | 0 |
| Control | 7.54 | 8.797 | 2.851 | 5.946 | 57.0 | 43.1 | 47.2 |
| 1 uM | 7.49 | 8.832 | 2.864 | 5.968 | 61.0 | 42.5 | 48.1 |
| 10 uM | 7.53 | 8.777 | 2.852 | 5.925 | 59.7 | 43.7 | 48.5 |
| 100 uM | 7.51 | 8.801 | 2.868 | 5.933 | 61.0 | 43.5 | 50.0 |
| 1000 uM | 7.53 | 8.976 | 3.052 | 5.924 | 62.3 | 43.7 | 50.1 |

TABLE 10

Methane Production from CA Amended Cultures

| | Methane Production ($10^{-3}$ g mole/L) Day | | | |
|---|---|---|---|---|
| Amendment | 4 | 6 | 9 | 15 |
| Control | 4.6 | 7.7 | 9.1 | 9.0 |
| 1 uM | 48 | 7.9 | 9.4 | 9.2 |
| 10 uM | 4.8 | 8.1 | 9.6 | 9.2 |
| 100 uM | 5.4 | 8.3 | 9.8 | 9.5 |
| 1000 uM | 5.6 | 8.6 | 10.1 | 9.5 |

As noted, the solids concentrations differ between experiments and, consequently, the gas production and methane production differ. Each experiment was started with fresh inoculum at different times, therefore, the concentrations were dependent upon the samples obtained from the treatment plant. Consequently, comparison between tables for the various amendments should be based upon the improvement over the control in each experiment.

The accuracy and precision of the data in Tables 3–10 can be determined by material balance on the samples. For example, Table 3 shows that the initial volatile solids concentration of the sludge was 6.195 g/L. After 15 days, the volatile solids concentration had been reduced to an average of 4.496 g/L in the control samples. Therefore, 0.0298 g of volatile solids (after correction for dilution) was converted to gas. Using a conversion factor of 0.95 L gas/g solids destroyed (based on an average sludge composition of 50 percent carbon), the gas produced should equal 28.3 ml. The actual gas production measured was 35.5 ml, so that reasonable agreement is obtained. It should be noted that gas volumes are measured in a syringe by equilibrating the pressure in the serum bottle. This method of measurement is standard practice for small gas volumes, but allows some error, depending upon the friction in the syringe barrel.

Another check of the consistency of the data can be made from the methane production. The methane concentration in the serum bottle gas space is measured by gas/solid chromatography. These measurements are made periodically during the 15 day period and show the rate and quantity of methane produced. Established chromatography methods are used and these measurements should be accurate and reliable. Again, using data from the control samples of CDTA in Table 4, the methane concentration is 0.005 gmol/L. Multiplying by the volume of 130.5 ml (gas space plus gas produced) gives a methane production of 0.000653 gmol or a methane volume of 14.9 ml. Since the methane is about 60 percent of the gas production, the total gas produced is 24.8 ml, which agrees reasonably well with the 28.3 ml computed from volatile solids destruction.

Values of the calculated gas production from volatile solids and methane are given in the tables. It is concluded that the data are consistent between solids destruction and methane and total gas production. Although slight variations may be apparent, the data of the tables are sufficiently accurate to demonstrate trends and draw conclusions.

EXAMPLE 2

Addition of Inorganic Nutrients Alone

These experiments were conducted as in Example 1, except that nutrients were added in place of the chelating agents. The experiments were carried out in batch culture in 125 ml serum bottles with an inoculum of 29 ml of sludge from a waste water treatment plant and one ml of nutrient medium. The characteristics of the sludge vary depending upon the day of collection and are given in the first row of the following tables. The following nutrients were added in the following concentration ranges:

| Nutrient(s) | Concentration range |
|---|---|
| $FeCl_2$ | 1–5000 uM |
| $FESO_4.7H_2O$ | 1–1000 uM |
| $SeO_2$ | 1–100 uM |
| $NiCl_2$ | 1–1000 uM |

A control culture with no added nutrients was maintained for comparison. Three replicates of each experiment were conducted. The cultures were maintained in the incubator at 37° C. Solids and gas concentrations were monitored as a function of time for a period of 15–17 days. The same six parameters were evaluated as in Example 1.

TABLE 11

Results of $NiCl_2$ Amended Cultures
(after 15 days - all data are average of 3 replicates)

| Amendment | pH | Dry Solids g/L | Ash g/L | Volatile Solids g/L | Gas Production (ml) Measured | Calculated V.S. | Calculated Methane |
|---|---|---|---|---|---|---|---|
| Begin- | 7.49 | 11.860 | 3.348 | 8.512 | 0 | 0 | 0 |

TABLE 11-continued

Results of NiCl$_2$ Amended Cultures
(after 15 days - all data are average of 3 replicates)

| Amend-ment | pH | Dry Solids g/L | Ash g/L | Volatile Solids g/L | Gas Production (ml) Measured | Calculated V.S. | Calculated Methane |
|---|---|---|---|---|---|---|---|
| ning Control | 7.71 | 9.191 | 3.036 | 6.155 | 59.7 | 59.1 | 63.2 |
| 1 uM | 7.72 | 9.283 | 3.077 | 6.206 | 62.7 | 57.6 | 61.5 |
| 10 uM | 7.70 | 9.301 | 3.055 | 6.246 | 68.3 | 56.5 | 61.1 |
| 100 uM | 7.72 | 9.328 | 3.049 | 6.279 | 68.7 | 55.6 | 60.2 |
| 1000 uM | 7.70 | 9.483 | 2.895 | 6.588 | 62.3 | 46.8 | 54.3 |

TABLE 12

Methane Production from NiCl$_2$ Amended Cultures

Methane Production ($10^{-3}$ g mole/L) Day

| Amendment | 1 | 3 | 5 | 9 | 15 |
|---|---|---|---|---|---|
| Control | 4.589 | 7.532 | 8.988 | 9.849 | 10.794 |
| 1 uM | 4.647 | 7.519 | 9.011 | 9.954 | 10.602 |
| 10 uM | 4.611 | 7.523 | 9.093 | 9.906 | 10.609 |
| 100 uM | 4.597 | 7.415 | 8.940 | 9.702 | 10.513 |
| 1000 uM | 3.409 | 6.461 | 8.165 | 9.142 | 10.086 |

TABLE 13

Results of FeSO$_4$ Amended Cultures
(after 15 days - all data are average of 3 replicates)

| Amend-ment | pH | Dry Solids g/L | Ash g/L | Volatile Solids g/L | Gas Production (ml) Measured | Calculated V.S. | Calculated Methane |
|---|---|---|---|---|---|---|---|
| Beginning | 7.62 | 7.696 | 2.391 | 5.305 | 0 | 0 | 0 |
| Control | 7.80 | 6.217 | 2.157 | 4.060 | 43.3 | 30.4 | 34.6 |
| 10 uM | 7.77 | 6.319 | 2.199 | 4.120 | 45.3 | 28.7 | 34.1 |
| 100 uM | 7.80 | 6.273 | 2.193 | 4.080 | 41.7 | 29.9 | 34.6 |
| 1000 uM | 7.78 | 6.500 | 2.340 | 4.160 | 41.8 | 27.6 | 31.9 |

TABLE 14

Methane Production from FeSO$_4$ Amended Cultures

Methane Production ($10^{-3}$ mole/L) Day

| Amendment | 1 | 3 | 7 | 10 | 14 |
|---|---|---|---|---|---|
| Control | 3.142 | 5.227 | 6.178 | 6.504 | 7.270 |
| 10 uM | 3.182 | 5.274 | 6.138 | 6.524 | 7.264 |
| 100 uM | 3.273 | 5.266 | 6.073 | 6.447 | 7.293 |
| 1000 uM | 3.169 | 4.971 | 5.750 | 6.077 | 6.852 |

TABLE 15

Results of FeCl$_2$ Amended Cultures
(after 15 days - all data are average of 3 replicates)

| Amend-ment | pH | Dry Solids g/L | Ash g/L | Volatile Solids g/L | Gas Production (ml) Measured | Calculated V.S. | Calculated Methane |
|---|---|---|---|---|---|---|---|
| Beginning | 7.97 | 8.824 | 2.592 | 6.232 | 0 | 0 | 0 |
| Control | 7.78 | 6.847 | 2.353 | 4.494 | 37.0 | 43.6 | 44.6 |
| 10 uM | 7.77 | 7.056 | 2.403 | 4.653 | 48.3 | 39.1 | 42.7 |
| 100 uM | 7.78 | 6.703 | 2.204 | 4.499 | 46.7 | 43.5 | 44.1 |
| 1000 uM | 7.72 | 7.108 | 2.457 | 4.651 | 47.3 | 39.1 | 41.2 |
| 5000 uM | 7.58 | 7.912 | 2.769 | 5.143 | 44.0 | 25.1 | 35.5 |

TABLE 16

Methane Production from FeCl$_2$ Amended Cultures

Methane Production ($10^{-3}$ mole/L) Day

| Amendment | 1 | 4 | 8 | 11 | 17 |
|---|---|---|---|---|---|
| Control | 3.352 | 5.996 | 7.473 | 7.644 | 8.460 |
| 10 uM | 3.378 | 6.077 | 7.437 | 7.728 | 8.386 |
| 100 uM | 3.282 | 5.966 | 7.467 | 7.925 | 8.387 |
| 1000 uM | 3.277 | 5.791 | 7.209 | 7.487 | 8.091 |
| 5000 uM | 3.042 | 5.518 | 6.876 | 7.236 | 7.784 |

TABLE 17

Results of SeO$_2$ Amended Cultures
(after 15 days - all data are average of 3 replicates)

| Amend-ment | pH | Dry Solids g/L | Ash g/L | Volatile Solids g/L | Gas Production (ml) Measured | Calculated V.S. | Calculated Methane |
|---|---|---|---|---|---|---|---|
| Beginning | 7.97 | 14.172 | 4.428 | 9.744 | 0 | 0 | 0 |
| Control | 7.77 | 11.009 | 3.931 | 7.078 | 70.2 | 66.7 | 62.8 |
| 1 uM | 7.81 | 11.103 | 3.923 | 7.180 | 72.0 | 63.8 | 63.5 |
| 10 uM | 7.94 | 11.121 | 3.939 | 7.182 | 72.7 | 63.8 | 61.5 |
| 100 uM | 7.96 | 11.144 | 3.979 | 7.165 | 72.7 | 64.2 | 59.8 |

TABLE 18

Methane Production from SeO$_2$ Amended Cultures

Methane Production ($10^{-3}$ mole/L) Day

| Amendment | 1 | 3 | 5 | 11 | 15 |
|---|---|---|---|---|---|
| Control | 3.765 | 6.736 | 7.780 | 9.510 | 10.223 |
| 1 μM | 3.893 | 6.753 | 7.805 | 9.668 | 10.528 |
| 10 μM | 3.966 | 6.849 | 7.891 | 9.500 | 10.201 |
| 100 μM | 3.846 | 6.605 | 7.607 | 9.327 | 9.888 |

The consistency of the data in Tables 11–18 was reviewed on the basis of volatile solids conversion and gas and methane production. For example, Table 11 shows that the volatile solids were reduced from 8.512 g/L to 6.155 for the NiCl$_2$ control culture. The volatile solids destroyed should produce 59.1 ml of total gas, which compares closely with the 59.7 ml measured. The gas volume computed from the methane produced in Table 12 is 63.2 ml, close to the value computed from volatile solids and measured.

EXAMPLE 3

Addition of Chelating Agents and Nutrients

These experiments were conducted in the same manner as the chelating and nutrient experiments described in Examples 1 and 2. In these experiments, FeSO$_4$ was added alone and along with either CA or CDTA.

The results are presented in Tables 19–20. The same six parameters were evaluated and the data are in the same form as previously described.

TABLE 19

Results of 1000 uM FeSO$_4$ and Chelating Agent Amended Sludge
(After 17 days - all data are average of 3 replicates)

| Amend-ment | pH | Dry Solids g/L | Ash g/L | Volatile Solids g/L | Gas Production (ml) Meas. | Calculated V.S. | Calculated Methane |
|---|---|---|---|---|---|---|---|
| Beginning | 7.39 | 16.368 | 5.239 | 11.129 | 0 | 0 | 0 |
| Control | 7.62 | 12.063 | 4.572 | 7.491 | 85.7 | 98.2 | 105.1 |
| 1000 uM FeSO | 7.59 | 12.516 | 4.804 | 7.712 | 74.7 | 86.8 | 94.6 |

TABLE 19-continued

Results of 1000 uM FeSO4 and Chelating Agent Amended Sludge
(After 17 days - all data are average of 3 replicates)

| Amendment | pH | Dry Solids g/L | Ash g/L | Volatile Solids g/L | Gas Production (ml) Meas. | Calculated V.S. | Calculated Methane |
|---|---|---|---|---|---|---|---|
| 1000 uM FeSO +20 uM CACA | 7.63 | 12.597 | 4.865 | 7.732 | 88.7 | 86.2 | 97.7 |
| 1000 uM FeSO +20 uM CDTA | 7.74 | 12.571 | 4.849 | 7.722 | 95.7 | 86.5 | 101.2 |

TABLE 20

Methane Production from 1000 uM FeSO4 and Chelating Agent Amended Sludge

| Amendment | Methane Production ($10^{-3}$ mole/L) Day 1 | 4 | 9 | 17 |
|---|---|---|---|---|
| Control | 6.842 | 10.778 | 13.705 | 14.318 |
| 1000 uM FeSO | 6.585 | 10.410 | 13.429 | 13.688 |
| 1000 uM FeSO +20 uM CA | 6.755 | 10.813 | 13.777 | 14.181 |
| 1000 uM FeSO +20 uM CDTA | 6.833 | 10.978 | 13.893 | 14.665 |

EXAMPLE 4

Addition of Methanogens—Batch Experiments

Sludge was introduced into serum bottles as described in Example 1. Pure cultures of methanogens grown in a mineral salts medium without rich organics were used for injection into the bottles of sludge. The following methanogens were used:

Methanosarcina barkeri (MB)
Methanobrevibacter smithii (MS)
Methanobacterium formicium (MF)

The methanogens used in this study were grown in 1 liter bottles containing biphasic medium (250 ml of agar and 80 ml of liquid medium). The headspace contained 80% $H_2$:20% $CO_2$ at 20 psi. This method produced cells at 20-25 grams per liter in four days. These cells were then injected into the digester sludge anaerobically using syringes.

These organisms were inoculated singly and in combination. A quantity of 2 ml of the pure culture containing 20–25 g/L methanogens was added to 28 ml of sludge in the serum bottle.

The data from these experiments are shown in Tables 21 and 22.

TABLE 21

Results of Methanogen Amended Sludge
(After 18 days - all data are average of three replicates)

| Amendment | H | Dry Solids g/L | Ash g/L | Volatile Solids g/L | Gas Production (ml) Meas. | Calculated V.S. | Calculated Methane |
|---|---|---|---|---|---|---|---|
| Beginning | 8.02 | 16.128 | 5.276 | 10.852 | 0 | 0 | 0 |
| Control | 7.81 | 13.254 | 4.871 | 8.383 | 63.0 | 49.7 | 56.1 |
| MF | 7.89 | 12.991 | 4.856 | 8.135 | 70.3 | 56.8 | 62.2 |
| MB | 7.84 | 13.064 | 4.856 | 8.208 | 78 | 54.7 | 64.4 |
| MS | 7.83 | 12.946 | 4.826 | 8.120 | 67.3 | 57.2 | 62.1 |
| MF + MB | 7.91 | 12.851 | 4.813 | 8.038 | 68.3 | 59.6 | 63.5 |
| MF + | 7.94 | 12.827 | 4.749 | 8.078 | 68.3 | 58.4 | 61.2 |
| MS MB + MS | 7.84 | 12.689 | 4.727 | 7.962 | 66.0 | 61.7 | 64.3 |
| MF + MB + MS | 7.75 | 12.624 | 4.764 | 7.860 | 62.3 | 64.7 | 65.4 |

TABLE 22

Methane Production from Cultures Amended with Methanogens

| Amendment | Methane Production ($10^{-3}$ g mole/L) Day 1 | 3 | 5 | 10 | 18 |
|---|---|---|---|---|---|
| Control | 4.05 | 7.33 | 8.71 | 9.30 | 10.20 |
| MF | 4.85 | 7.78 | 9.18 | 9.75 | 10.79 |
| MB | 5.21 | 8.01 | 9.66 | 10.08 | 11.32 |
| MS | 4.91 | 7.78 | 9.34 | 9.72 | 10.73 |
| MF + MB | 4.98 | 7.76 | 9.22 | 9.73 | 10.81 |
| MF + MS | 4.92 | 7.74 | 9.15 | 9.65 | 10.49 |
| MB + MS | 5.02 | 7.95 | 9.34 | 9.95 | 10.79 |
| MF + MB + MS | 4.97 | 7.79 | 9.22 | 9.85 | 10.78 |

EXAMPLE 5

Addition of Methanogens—Continuous Experiments, Start-up

Semi-continuous reactors were used to evaluate the enhancement of a digester start-up with the addition of methanogens. Five-liter Plexiglas reactors, with a three-liter liquid volume, as illustrated in FIG. 3, were utilized. The reactors were equipped with continuous mechanical agitators. Substrate was introduced daily through a valve and entrance port below the liquid level. Gas was discharged through an opening at the top and collected in polyethylene bags for measurement in a wet test meter. The reactors were incubated at 37° C.

Thickened sludge (feed material to the digesters from the Springdale, Arkansas wastewater treatment plant) was used as substrate for these experiments. The characteristics of the sludge were as follows:

| | |
|---|---|
| pH | 5.32 |
| Total Solids | 47.969 g/L |
| Ash | 8.019 g/L |
| Volatile Solids | 39.95 g/L |

Two reactors were started simultaneously. Both reactors were adjusted to pH 7 and were inoculated with 500 ml of active anaerobic digester sludge and 2.4 L distilled water. One reactor was also amended with 10 uM citric acid and was inoculated with 250 ml of a pure culture of Methanosarcina barkeri (MB) which had been grown to a concentration of approximately 20 g/L.

Both reactors were operated the same, being fed thickened sludge on a five-day retention time. The pH was adjusted daily with sodium bicarbonate. The reactors were agitated at approximately 100 rpm. The methanogen amended reactor was also fed citric acid daily to maintain a concentration of 10 uM. Gas volumes and concentrations were measured daily. The methane production and improvements are shown on Table 23.

TABLE 23

Methane Production from MB Amended Culture

| Week | Methane production (L/wk) | | |
|---|---|---|---|
| | Control | MB Amended | Improvement % |
| 1 | 9.754 | 12.325 | 26.4 |
| 2 | 13.553 | 17.529 | 29.3 |
| 3 | 15.192 | 20.099 | 32.3 |
| 4 | 14.652 | 15.908 | 8.6 |

The importance of these results is apparent in more rapid starts of digesters. For the first two weeks, the amended culture reached the same gas production level as the control within 3–4 days less time. However, for the last two weeks, the same gas production was achieved 4–6 days quicker. Therefore, digester start-up times could be shortened by about 25 percent, or perhaps more with a longer retention time.

More importantly, the increased rate of methane production is sustained even after four weeks. This indicates that such an improvement might be sustained over an extended period, perhaps with periodic addition of methanogens.

EXAMPLE 6

Addition of Methanogens—Continuous Experiments/Recovery

Additional continuous experiments were conducted to determine the effect which the addition of methanogens would have on the recovery of an upset digester. The two reactors used for the start-up experiments described in Example 5 were shocked by depressing the pH to 4.5 for 48 hours. Both reactors were then adjusted to pH 7 and one reactor was amended by addition of 250 ml of *Methanosarcina barkeri* and 10 uM citric acid. The reactors were then operated on a 10-day retention time over a two-week period.

The gas production rates for each two day period are given in Table 24 for the two reactors. Gas compositions were around 60 percent methane. FIG. 5 shows the cumulative gas production over the two week period. After a period of two days, the amended culture began producing gas at a rate similar to that of a normal digester. The rate continued to improve and, after two weeks, the gas production had nearly doubled the control. The marked difference between the start-up reactor and the shocked reactor can be attributed to the longer retention time and fact that a higher methanogen population had been established prior to the shock.

TABLE 24

Total Gas Production During Recovery of Upset Digester

| | Gas Production (L/wk) | | |
|---|---|---|---|
| | Control | MB Amended | Improvement |
| 1/2 | 0.947 | 1.647 | 74 |
| 3/4 | 2.124 | 3.123 | 47 |
| 5/6 | 1.320 | 2.532 | 92 |
| 7/8 | 1.150 | 2.351 | 104 |
| 9/10 | 0.761 | 2.407 | 216 |
| 11/12 | 1.678 | 2.561 | 53 |
| 13/14 | 2.999 | 4.571 | 52 |

EXAMPLE 7

Chelation Optimizing Experiments—Continuous Culture

Two-liter reactors, with IL of liquid culture volume were used in this experiment. All the reactors were incubated inside a cabinet maintained at 38°0 C. Autoclaved sludge was fed daily in the quantity required to maintain the desired retention time. An equal amount of effluent was withdrawn. The sludge was obtained periodically from the Springdale, Arkansas Waste Treatment facility. The gas produced was collected in polyethylene bags through quick connect fittings and was measured once every three days by a water displacement facility. Control reactors were operated under identical conditions for comparison. Gas composition and the total solids, volatile solids, and ash content of the effluent were measured periodically.

Three chelating agents, CA, NTA, and EDTA, were utilized in concentrations from 1–500 uM. The chelating agent studies included 10 and 100 uM concentrations at 10, 15 and 25 day retention times and a 500 uM concentration at a 25 day retention time. The concentrations (uM) of chelator relate to the sludge additions only. The results of these studies are summarized in Table 25 and FIGS. 6 and 7. The results are given as the percentage of improvement over the control reactor. The averages stated are ±10 percent in the 95 percent confidence interval.

TABLE 25

Average Gas Production of Chelating Agent Test and Percent Improvement over the Control.

| | Retention Time | | | | | |
|---|---|---|---|---|---|---|
| | 10 days | | 15 days | | 25 days | |
| | L/day | Imprv. | L/day | Imprv. | L/day | Imprv. |
| A. 10 uM Conc. | | | | | | |
| Control | 1.934 | | 1.224 | | 0.571 | |
| EDTA | 2.005 | 3.7% | 1.532 | 25.2% | 0.754 | 32.0% |
| CA | 2.111 | 9.2% | 1.414 | 15.6% | 0.786 | 37.7% |
| NTA | | | 1.391 | 13.6% | | |
| B. 100 uM Conc. | | | | | | |
| Control | 1.583 | | 1.297 | | 0.533 | |
| EDTA | 1.622 | 2.5% | 1.646 | 26.9% | 0.711 | 33.5% |
| CA | 1.849 | 16.8% | 1.480 | 14.1% | 0.683 | 28.1% |
| NTA | 1.690 | 6.8% | 1.457 | 12.3% | 0.663 | 24.5% |
| C. 500 uM Conc. | | | | | | |
| Control | | | | | 0.583 | |
| EDTA | | | | | 0.892 | 53.0% |
| Control | | | | | 0.567 | |
| CA | | | | | 0.838 | 47.8% |

FIGS. 6 and 7 show the improvement in gas production vs. dosage of EDTA and CA amendment, respectively. As shown in these figures, the improvement is more sensitive to the retention time than to the amendment concentration. As expected, the longer the retention time, the greater the improvement. At low retention time (higher flow rates), adequate dissolved nutrients are supplied for microbial growth. However, at longer retention times, solubilized nutrients required for maximum growth are insufficient without the use of chelating agents. Also, as noted in Table 25, larger quantities of gas are produced at shorter retention times; therefore, the percentage improvement is less for the same increase in gas production. However, more chelator is added at the higher flow rates.

FIG. 8 shows the combined (average) improvement for both CA and EDTA. The greatest improvement is achieved with a 10 uM dosage. Above this level, the improvement shows a constant slope. The amount of methane produced from the chelator added at 500 uM could account for only a one percent or less improvement. Therefore, some enhancement is achieved with dosages above 10 uM, although the enhancement is only about 3 percent per 100 uM added.

The combined gas production and improvement for both EDTA and CA amendment, with different dosages, was plotted vs. retention time in FIG. 9. The improvement is proportional to the retention time, with a slope of 2.1 percent per day. Most commercial digesters operate at 25 day-retention times or longer. Therefore, even greater percentage improvements can be expected with chelation amendment. FIG. 9 also shows the expected gas production rates (per liter of liquid volume). These data give a negative slope with increasing retention time. Because the amount of volatile solids fed at long retentions is less than the amount fed at short retentions, the quantity of gas produced decreases as retention time increases.

EXAMPLE 8

Annual Savings Estimates

The base case in this study is a 2.4 mill-ion liter digester, with the assumption that 60 percent of the gas produced is methane and methane has a value of $3.0 per thousand cubic feet (MCF). The normal gas production is based on 75 percent of the average gas production found in Table 25. The gas production rates in Table 25 were obtained under ideal laboratory conditions and 75 percent of these values is more realistic. Thus, the normal annual methane production is 24,508, 17,569, and 7,856 MCF/yr for 10, 15, and 25 days retention time, respectively. The increased methane production by the amendment is found from FIGS. 6 and 7. The annual chelating agent cost is estimated as the sum of the cost of the initial amendment and the further additions to maintain the dosage concentration for one year. The annual usage of chelating agent is listed in Table 26. The current unit costs of EDTA and CA are $0.803/Kg and $1,837/Kg, respectively. Therefore, the net benefit of the amendment can be found by subtracting the chelating agent cost from the value of the added methane production. In addition, cost benefits result from a reduction in sludge quantity to be disposed, which could exceed the increased methane value. Perhaps more importantly, the need for increased physical capacity of existing facilities can be delayed by increasing capacities with chelation.

TABLE 26

| Annual Chelating Agent Required Amount | | | |
|---|---|---|---|
| | Chelator Concentration* | | |
| Retention Time | 10 uM | 100 uM | 500 uM |
| 10 days | 900 | 9,000 | 45,000 |
| 15 days | 608 | 6,179 | 30,396 |
| 25 days | 375 | 3,744 | 18,720 |

*values in g-moles/yr

EXAMPLE 9

Extended Continuous Methanogen Experiments

*Methanosarcina barkeri* was added to 2L bench scale digesters (as described in Example 7) in varying quantities and on different schedules. Continuous experiments were initiated using an inoculum of *Methanosarcina barkeri* at the level of 1 g/L to determine the enhancement of pure culture methanogens. Two reactors were started with fresh sludge at a 25-day retention time. When the performance of both reactors were parallel, one reactor was inoculated with 75 ml of *Methanosarcina barkeri* at a concentration of 12.01 g/l to bring the contents of the reactor to a concentration of about 1 g/L. The other reactor served as a control. These reactors were operated for an extended period of five months.

The gas production of these reactors is listed in Table 27 and plotted in FIGS. 12 and 13. The performance steadily improved, with gas production exceeding the control by 9 percent the first month, 22 percent the second month, 32 percent the third month, 38 percent the fourth month, and 41 percent the fifth month. The cumulative improvement averaged 35 percent. The data indicated that during the last month, the continued improvement of the amended reactor over the control was largely due to the slower recovery of the control reactor to variations in sludge quality. After 120 days, the sludge quality changed, and the gas production in the control reactor declined sharply. The amended reactor, however, showed no decline at 120 days, indicating excellent stability. Methane concentrations averaged about 66 percent of total gas production and pH remained normal over the five-month period. The improved performance of the amended reactor appears to be permanent at the 25-day retention time, with no evidence of a decline in gas production after five months.

TABLE 27

| | Gas Production and pH of 1 g/L Methanogen Test | | | | | |
|---|---|---|---|---|---|---|
| METHANOGEN: | CONTROL | | | METHANOSARCINA | | |
| CONCENTRATION: | 0.0 G/L | | | 1.0 G/L | | |
| RETENTION TIME: | 25.0 DAYS | | | 25.0 DAYS | | |
| DATE | V L/DAY | ACC. V L | pH | V L/DAY | ACC. V L | pH |
| 6 18 87 | 0.504 | 1.511 | 7.31 | 0.668 | 2.005 | 7.33 |
| 6 21 87 | 0.741 | 3.735 | 7.34 | 0.702 | 4.111 | 7.36 |
| 6 24 87 | 0.480 | 5.176 | 7.38 | 0.675 | 6.135 | 7.32 |
| 6 27 87 | 0.650 | 7.127 | 7.38 | 0.615 | 7.981 | 7.37 |
| 6 30 87 | 0.582 | 8.875 | 7.49 | 0.593 | 9.760 | 7.49 |
| 7 3 86 | 0.469 | 10.282 | 7.45 | 0.576 | 11.487 | 7.48 |
| 7 6 87 | 0.580 | 12.022 | 7.46 | 0.650 | 13.437 | 7.40 |
| 7 9 87 | 0.566 | 13.719 | 7.46 | 0.555 | 15.102 | 7.40 |
| 7 12 87 | 0.553 | 15.378 | 7.33 | 0.569 | 16.808 | 7.34 |
| 7 15 87 | 0.530 | 15.968 | 7.33 | 0.568 | 18.511 | 7.36 |
| 7 18 87 | 0.377 | 18.099 | 7.44 | 0.549 | 20.159 | 7.42 |
| 7 21 87 | 0.248 | 18.841 | 7.48 | 0.688 | 22.222 | 7.47 |
| 7 24 87 | 0.096 | 19.129 | 7.47 | 0.659 | 24.198 | 7.45 |
| 7 27 87 | 0.099 | 19.425 | 7.34 | 0.599 | 25.996 | 7.28 |
| 7 30 87 | 0.493 | 20.905 | 7.29 | 0.646 | 27.935 | 7.30 |
| 8 2 87 | 0.447 | 22.245 | 7.31 | 0.726 | 30.113 | 7.30 |

TABLE 27-continued

| | Gas Production and pH of 1 g/L Methanogen Test | | | | | |
|---|---|---|---|---|---|---|
| METHANOGEN: | CONTROL | | | METHANOSARCINA | | |
| CONCENTRATION: | 0.0 G/L | | | 1.0 G/L | | |
| RETENTION TIME: | 25.0 DAYS | | | 25.0 DAYS | | |
| DATE | V L/DAY | ACC. V L | pH | V L/DAY | ACC. V L | pH |
| 8  5 87 | 0.491 | 23.718 | 7.31 | 0.668 | 32.117 | 7.30 |
| 8  8 87 | 0.576 | 24.445 | 7.29 | 0.659 | 34.094 | 7.20 |
| 8 11 87 | 0.610 | 27.275 | 7.30 | 0.739 | 36.311 | 7.28 |
| 8 14 87 | 0.620 | 29.136 | 7.28 | 0.626 | 38.189 | 7.30 |
| 8 17 87 | 0.665 | 31.130 | 7.08 | 0.526 | 39.767 | 7.04 |
| 8 20 87 | 0.670 | 33.142 | 7.28 | 0.713 | 41.905 | 7.31 |
| 8 23 87 | 0.590 | 34.913 | 7.38 | 0.836 | 44.414 | 7.35 |
| 8 26 87 | 0.670 | 36.923 | 7.29 | 0.763 | 46.702 | 7.27 |
| 8 29 87 | 0.592 | 38.700 | 7.31 | 0.860 | 49.281 | 7.30 |
| 9  1 87 | 0.461 | 40.084 | 7.33 | 0.672 | 51.296 | 7.39 |
| 9  4 87 | 0.312 | 31.020 | 7.39 | 0.504 | 52.809 | 7.37 |
| 9  7 87 | 0.102 | 31.325 | 7.40 | 0.557 | 54.479 | 7.41 |
| 9 10 87 | 0.392 | 42.503 | 7.43 | 0.477 | 55.910 | 7.45 |
| 9 13 87 | 0.404 | 43.715 | 7.40 | 0.516 | 57.457 | 7.38 |
| 9 16 87 | 0.364 | 44.807 | 7.44 | 0.486 | 58.914 | 7.44 |
| 9 19 87 | 0.405 | 46.022 | 7.45 | 0.492 | 60.390 | 7.45 |
| 9 22 87 | 0.387 | 47.182 | 7.35 | 0.474 | 61.813 | 7.36 |
| 9 25 87 | 0.461 | 48.565 | 7.32 | 0.524 | 63.385 | 7.35 |
| 9 28 87 | 0.446 | 49.903 | 7.24 | 0.540 | 65.005 | 7.32 |
| 10  1 87 | 0.502 | 51.410 | 7.28 | 0.577 | 66.736 | 7.33 |
| 10  4 87 | 0.471 | 42.825 | 7.30 | 0.667 | 68.739 | 7.34 |
| 10  7 87 | 0.462 | 54.211 | 7.35 | 0.733 | 70.938 | 7.36 |
| 10 10 87 | 0.577 | 55.941 | 7.41 | 0.757 | 73.208 | 7.44 |
| 10 13 87 | 0.425 | 57.215 | 7.24 | 0.743 | 75.438 | 7.40 |
| 10 16 87 | 0.431 | 58.509 | 7.40 | 0.811 | 77.872 | 7.40 |
| 10 19 87 | 0.470 | 59.919 | 7.40 | 0.695 | 79.957 | 7.42 |
| 10 22 87 | 0.440 | 61.240 | 7.37 | 0.627 | 81.839 | 7.44 |
| 10 25 87 | 0.506 | 62.757 | 7.37 | 0.732 | 84.935 | 7.41 |
| 10 28 87 | 0.634 | 64.658 | 7.39 | 0.733 | 86.235 | 7.41 |
| 10 31 87 | 0.655 | 66.623 | 7.39 | 0.861 | 88.818 | 7.41 |
| 11  3 87 | 0.566 | 68.322 | 7.37 | 0.875 | 91.444 | 7.36 |
| 11  6 87 | 0.556 | 69.991 | 7.33 | 0.903 | 94.153 | 7.34 |

NOTE: V: GAS PRODUCTION RATE IN STP L/DAY
ACC. V: ACCUMULATED GAS PRODUCTION IN STP L
CONT: CONTROL

An additional 1 g/L of *Methanosarcina barkeri* was added to the methanogen reactor after the five-month period. The re-amended reactor was operated for another four months. The performance of this reactor and control are given in Table 28 and FIGS. 14 and 15. The average gas production was further improved to a level of 50% following the second inoculation. This level of improvement was sustained for the four month period and it was concluded that the enhancement was permanent, or at least long term. The gas production averaged 0.899 L/day from the methanogen reactor and 0.567 L/day for the control. Thus, the addition of methanogens resulted in a 59 percent improvement.

TABLE 28

| | Gas Production and pH of 2 g/L Methanogen Test | | | | | |
|---|---|---|---|---|---|---|
| METHANOGEN: | CONTROL | | | METHANOSARCINA | | |
| CONCENTRATION: | 0.0 G/L | | | 1.0 G/L | | |
| RETENTION TIME: | 25.0 DAYS | | | 25.0 DAYS | | |
| DATE | V L/DAY | ACC. V L | pH | V L/DAY | ACC. V L | pH |
| 11 15 87 | 0.571 | 1.713 | 7.39 | 0.882 | 2.646 | 7.38 |
| 11 18 87 | 0.516 | 3.262 | 7.43 | 0.800 | 5.044 | 7.42 |
| 11 21 87 | 0.516 | 4.810 | 7.45 | 0.765 | 7.341 | 7.45 |
| 11 24 87 | 0.644 | 6.743 | 7.45 | 0.926 | 10.118 | 7.41 |
| 11 27 87 | 0.609 | 8.569 | 7.48 | 0.758 | 12.392 | 7.48 |
| 11 30 87 | 0.655 | 10.533 | 7.30 | 0.851 | 14.945 | 7.34 |
| 12  3 87 | 0.659 | 12.509 | 7.34 | 0.844 | 17.477 | 7.34 |
| 12  6 87 | 0.538 | 14.122 | 7.47 | 0.745 | 19.712 | 7.46 |
| 12  9 87 | 0.614 | 15.963 | 7.43 | 0.813 | 22.151 | 7.41 |
| 12 12 87 | 0.553 | 17.621 | 7.42 | 0.836 | 24.660 | 7.39 |
| 12 15 87 | 0.475 | 19.046 | 7.41 | 0.835 | 27.164 | 7.41 |
| 12 18 87 | 0.441 | 20.371 | 7.38 | 0.623 | 29.035 | 7.40 |
| 12 21 87 | 0.454 | 21.733 | 7.43 | 0.727 | 31.216 | 7.41 |
| 12 24 87 | 0.497 | 23.224 | 7.45 | 0.833 | 33.716 | 7.43 |
| 12 27 87 | 0.633 | 25.122 | 7.41 | 0.722 | 35.882 | 7.39 |
| 12 31 87 | 0.624 | 26.994 | 7.39 | 0.807 | 38.303 | 7.41 |
| 1  2 88 | 0.500 | 28.495 | 7.39 | 0.812 | 40.739 | 7.36 |
| 1  5 88 | 0.404 | 29.706 | 7.38 | 0.621 | 42.602 | 7.38 |
| 1  8 88 | 0.509 | 31.232 | 7.30 | 0.726 | 44.779 | 7.27 |
| 1 11 88 | 0.473 | 32.650 | 7.38 | 1.066 | 47.977 | 7.37 |
| 1 14 88 | 0.680 | 34.691 | 7.35 | 0.918 | 50.732 | 7.31 |
| 1 17 88 | 0.638 | 36.604 | 7.39 | 0.692 | 52.802 | 7.38 |
| 1 20 88 | 0.752 | 38.862 | 7.39 | 1.044 | 55.941 | 7.38 |
| 1 23 88 | 0.497 | 40.352 | 7.29 | 1.189 | 59.508 | 7.35 |

TABLE 28-continued

Gas Production and pH of 2 g/L Methanogen Test

| METHANOGEN: | CONTROL | | | METHANOSARCINA | | |
|---|---|---|---|---|---|---|
| CONCENTRATION: | 0.0 G/L | | | 1.0 G/L | | |
| RETENTION TIME: | 25.0 DAYS | | | 25.0 DAYS | | |
| DATE | V L/DAY | ACC. V L | pH | V L/DAY | ACC. V L | pH |
| 1 26 88 | 0.526 | 41.931 | 7.48 | 1.041 | 62.632 | 7.45 |
| 1 29 88 | 0.764 | 44.223 | 7.44 | 1.062 | 65.816 | 7.43 |
| 2 1 88 | 0.680 | 46.262 | 7.47 | 1.157 | 69.287 | 7.48 |
| 2 4 88 | 0.569 | 47.969 | 7.41 | 1.029 | 72.373 | 7.42 |
| 2 7 88 | 0.630 | 49.859 | 7.40 | 1.081 | 75.615 | 7.36 |
| 2 10 88 | 0.586 | 51.618 | 7.46 | 0.975 | 78.539 | 7.46 |
| 2 13 88 | 0.590 | 53.388 | 7.44 | 1.199 | 83.136 | 7.45 |
| 2 16 88 | 0.645 | 55.324 | 7.40 | 1.045 | 85.272 | 7.38 |
| 2 19 88 | 0.625 | 57.199 | 7.48 | 0.927 | 88.054 | 7.48 |
| 2 22 88 | 0.471 | 58.613 | 7.38 | 0.812 | 90.489 | 7.42 |
| 2 25 88 | 0.643 | 60.543 | 7.51 | 0.841 | 92.012 | 7.52 |
| 2 28 88 | 0.547 | 62.184 | 7.40 | 0.847 | 95.553 | 7.38 |
| 3 2 88 | 0.537 | 63.795 | 7.41 | 0.838 | 98.067 | 7.40 |
| 3 5 88 | 0.477 | 65.226 | 7.45 | 0.872 | 100.681 | 7.44 |
| 3 8 88 | 0.603 | 67.036 | 7.48 | 0.780 | 103.022 | 7.50 |

NOTE: V: GAS PRODUCTION RATE IN STP L/DAY
ACC. V: ACCUMULATED GAS PRODUCTION IN STP L
CONT: CONTROL

EXAMPLE 10

Recovery of Methanogen Amended Reactor From Upset

These experiments were conducted as described in Example 8. Both the control and methanogen reactors were upset by adding sulfuric acid to reduce the pH to 4.0 for one day after which the pH was returned to 7.0 by adding 10% sodium bicarbonate. Table 29 and FIGS. 16 and 17 show the performance of these reactors following the upset. The gas production for both reactors was severely inhibited during the first three weeks. However, the gas production for both reactors quickly recovered and the production levels were increased to about twice the pre-upset levels. The methane composition for both reactors reduced to 45% during the inhibited period, but returned to the 63% level when the gas production recovered. The unexpected high gas production lasted about two months with practically no difference in the production rates between the two reactors. The gas production of the control reactor then started to decline after two months. The gas production of the amended reactor did not decline and the improvement was about 60% for the remainder of the experiment.

TABLE 29

Gas Production and pH for the Upset Methanogen Reactor

| METHANOGEN: | CONTROL | | | METHANOSARCINA | | |
|---|---|---|---|---|---|---|
| CONCENTRATION: | 0.0 G/L | | | 3 G/L | | |
| RETENTION TIME: | 25.0 DAYS | | | 25.0 DAYS | | |
| DATE | V L/DAY | ACC. V L | pH | V L/DAY | ACC. V L | pH |
| 3 18 88 | 0.152 | 0.455 | 6.95 | 0.282 | 0.563 | 7.01 |
| 3 20 88 | 0.269 | 1.144 | 7.06 | 0.355 | 1.555 | 7.13 |
| 3 23 88 | 0.164 | 1.636 | 7.07 | 0.202 | 2.162 | 7.16 |
| 3 26 88 | 0.137 | 2.047 | 7.23 | 0.207 | 2.783 | 7.28 |
| 3 29 88 | 0.147 | 2.488 | 7.32 | 0.207 | 3.404 | 7.35 |
| 4 1 88 | 0.219 | 3.146 | 7.34 | 0.291 | 4.275 | 7.34 |
| 4 4 88 | 0.186 | 3.704 | 7.33 | 0.194 | 4.859 | 7.36 |
| 4 7 88 | 0.170 | 4.214 | 7.37 | 0.192 | 5.434 | 7.37 |
| 4 13 88 | 0.167 | 4.716 | 7.34 | 0.237 | 6.144 | 7.42 |
| 4 16 88 | 0.405 | 5.931 | 7.32 | 0.478 | 7.579 | 7.31 |
| 4 19 88 | 0.585 | 7.686 | 7.20 | 0.662 | 9.564 | 7.24 |
| 4 22 88 | 0.684 | 9.739 | 7.36 | 0.856 | 12.134 | 7.31 |
| 4 26 88 | 0.846 | 12.276 | 7.34 | 0.977 | 15.064 | 7.36 |
| 4 28 88 | 1.040 | 15.396 | 7.39 | 1.112 | 18.399 | 7.42 |
| 5 1 88 | 1.264 | 19.189 | 7.66 | 1.351 | 22.452 | 7.66 |
| 5 4 88 | 1.173 | 22.707 | 7.59 | 1.312 | 26.386 | 7.65 |
| 5 8 88 | 1.106 | 26.026 | 7.64 | 1.682 | 31.433 | 7.68 |
| 5 8 88 | 0.995 | 29.012 | 7.62 | 1.060 | 34.614 | 7.64 |
| 5 13 88 | 1.128 | 32.395 | 7.61 | 1.270 | 38.422 | 7.62 |
| 5 16 88 | 1.073 | 35.612 | 7.56 | 0.958 | 41.297 | 7.57 |
| 5 19 88 | 0.975 | 38.539 | 7.57 | 0.961 | 44.181 | 7.66 |
| 5 22 88 | 1.090 | 41.809 | 7.61 | 1.033 | 47.281 | 7.69 |
| 5 25 88 | 1.006 | 44.825 | 7.53 | 1.265 | 51.076 | 7.56 |
| 5 28 88 | 1.062 | 48.010 | 7.57 | 0.928 | 53.858 | 7.59 |
| 5 31 88 | 1.285 | 51.866 | 7.45 | 1.225 | 57.533 | 7.48 |
| 6 3 88 | 1.275 | 55.690 | 7.56 | 1.280 | 61.372 | 7.62 |
| 6 6 88 | 1.329 | 59.677 | 7.58 | 1.096 | 64.660 | 7.63 |
| 6 9 88 | 0.786 | 62.034 | 7.56 | 1.265 | 68.455 | 7.63 |
| 6 12 88 | 0.644 | 63.965 | 7.55 | 1.340 | 72.475 | 7.55 |
| 6 15 88 | 0.737 | 66.176 | 7.56 | 1.395 | 76.659 | 7.60 |
| 6 18 88 | 0.893 | 68.854 | 7.50 | 1.663 | 81.649 | 7.59 |

TABLE 29-continued

| Gas Production and pH for the Upset Methanogen Reactor | | | | | | |
|---|---|---|---|---|---|---|
| METHANOGEN: | CONTROL | | | METHANOSARCINA | | |
| CONCENTRATION: | 0.0 G/L | | | 3 G/L | | |
| RETENTION TIME: | 25.0 DAYS | | | 25.0 DAYS | | |
| DATE | V L/DAY | ACC. V L | pH | V L/DAY | ACC. V L | pH |
| 6 21 88 | 0.842 | 71.380 | 7.55 | 1.594 | 86.431 | 7.66 |

NOTE: V: GAS PRODUCTION RATE IN STP L/DAY
ACC. V: ACCUMULATED GAS PRODUCTION IN STP L
CONT: CONTROL

The unexpected high gas production from the upset reactors may have been caused by the use of sulfate. The sulfuric acid introduced is converted to sulfate when the acid is neutralized. Sulfate enhances the growth of sulfate reducing bacteria. There is recent evidence that some sulfate reducing bacteria, such as *Desulfobacter nostaatei*, utilize both $H_2$—$CO_2$ and acetate faster than methanogens. Therefore, the high gas production of both the reactors after the inhibition period may have been caused by the enhanced growth of sulfate reducing bacteria. After all the sulfate was displaced and consumed, the control reactor returned to a normal production level. The amended reactor stayed at the higher level of enhanced performance.

EXAMPLE 11

Field Trials

Data to establish the normal operation of the treatment plant were obtained prior to amendment. These base-line data were obtained for a one month period during the Summer 1987. Samples of the sludge entering and leaving the two anaerobic digesters were taken daily and analyzed for total solids and volatile solids. Data were also available from routine measurements by plant personnel. A comparison of results is shown in Table 30. Reasonable agreement is obtained, considering the differences in sampling times. The other information collected from the plant included the daily feed volumes and digester temperature.

TABLE 30

| Sludge Characteristics at the Springdale, AR Wast Treatment Facility. | | | |
|---|---|---|---|
| Average Concentration (g/l) July 1987 | | | |
| Total Solids | | Volatile Solids | |
| Plant Personnel | Lab Personnel | Plant Personnel | Lab Personnel |
| Entering | 23.89 | 20.25 | 17.49 | 16.69 |
| Leaving Digester 1 | | 15.06 | | 10.26 |
| Leaving Digester 2 | | 15.85 | | 10.79 |

Variability in the sludge feed concentrations on a daily basis was considerable (±60 percent). The effluent was somewhat more stable, but still varied ±30 percent. Table 31 gives the monthly averages for the volatile solids from the two digesters. The data show reasonable consistency on a monthly basis, but considerable variability was experienced on a daily basis.

TABLE 31

| Springdale Sludge Concentration in July and August 1987 | | | |
|---|---|---|---|
| | Volatile Solids Concentration (g/l) | | |
| Digester | July | August | Combined |
| 1 | 10.33 | 9.64 | 9.88 |
| 2 | 10.74 | 11.14 | 10.99 |

CA AMENDMENT

Field experiments at the Springdale Treatment Plant were initiated on Nov. 17, 1987. A 10 uM concentration of CA was added to Digester 2. Digester 1 was used as a control. The initial dosage of CA was 12.3 lb in water solution.

The feed rate of sludge varied considerably, from 30,000 to 100,000 gallons per day. The average rate was 45-50,000 gallons per day, and the average rate of addition of CA was 0.8 lb/day to maintain 10 uM. The solution of CA was pumped into the sludge circulation line.

The temperature of Digester 2 steadily declined and after about one month, the temperature was down to 80° F. with a 15° F. difference between Digester 1 and 2. Because of the temperature control problems, the two digesters were operated at significantly different retention times. Therefore, the addition of CA to Digester 2 was discontinued on Jan. 4, 1988. The amendment of 10 uM CA was shifted to Digester 1 on January 18. However, Digester 1 soon experienced a temperature reduction to about 88° F. There was a serious upset caused by overloading in early February and the field experiments were concluded on Mar. 15, 1988.

A summary of the weekly performances of these two digesters is given in Tables 32 and 33. Since the retention times and temperatures between these two digesters were significantly different, the comparison of each digester with its own previous level of performance is probably more meaningful.

It is generally agreed that the kinetics of anaerobic digestion can be described by a first order reaction. The steady state equation of a mixed reactor with first order kinetics is given by:

$$k^*RT = (C_i - C_o)/C_o$$

where k is the reaction constant, RT is the retention time, $C_i$ is the volatile solids concentration of the feed, and $C_o$ is the volatile solids concentration of the leaving stream. Thus, a plot of $(C_i - C_o)/C_o$ vs RT should be linear, passing through the origin with a slope of k.

The plots of the $(C_i - C_o)/C_o$ vs RT for weekly average data of each reactor are shown in FIGS. 18 and 19. FIG. 18 describes the performance of Digester 1. Linear relationships are shown for amended and unamended periods. The slope (value of k) of the best fit for the unamended period is 0.0594 days$^{-1}$. The reaction rate constant for the amended period is 0.062 days$^{-1}$, or a 4.4 percent improvement. This improvement occurred even though there was a 4.5° F. drop in temperature during the amended period. FIG. 19 gives the same data for Digester 2. As noted, k values for amended and unamended periods, found by fitting the least squares line through the origin, were 0.0531 and 0.0487 day$^{-1}$, respectively. The improvement was 9.03 percent. The improvement of Digester 2 was greater than Digester 1, however, the temperature of Digester 2 was more stable.

Another means of studying the effect of chelator amendment is to plot volatile solids conversion vs reciprocal retention time. The plots for Digesters 1 and 2 are shown in FIGS. 20 and 21, respectively. Linear relationships are obtained for both digesters. The same slopes are obtained for the amended and unamended periods. However, higher conversions are obtained with chelation addition. For Digester 1, the improvement is about 5 percent. For Digester 2, an improvement of 10.4 percent over the unamended period was obtained. These results are very close to the improvements in the reaction rate contant (4.7% for Digester 1 and 9% for Digester 2).

TABLE 32

Chelating Agent Field Test, Weekly Average Performance

| Date | Temp (°F.) D1 | Temp (°F.) D2 | Vol. Solids Conc. (g/L) D1 | Vol. Solids Conc. (g/L) D2 | Feed Rate (gallons) D1 | Feed Rate (gallons) D2 | Volatile Solids Fed (Kg) D1 | Volatile Solids Fed (Kg) D2 | Volatile Solids Fed (Kg/1000 gal) D1 | Volatile Solids Fed (Kg/1000 gal) D2 | Volatile Solids Destroyed (Kg) D1 | Volatile Solids Destroyed (Kg) D2 | Volatile Solids Destroyed (Kg/1000 gal) D1 | Volatile Solids Destroyed (Kg/1000 gal) D2 | Average % D1 | Average % D2 |
|---|---|---|---|---|---|---|---|---|---|---|---|---|---|---|---|---|
| | | | | | | BASELINE DATA | | | | | | | | | | |
| 7-16 to 7-22 | 97.8 | 94.7 | 11.420 | 11.140 | 157300 | 183800 | 10029.4 | 11737.6 | 63.8 | 63.9 | 3234.8 | 3958.8 | 20.6 | 21.5 | 32.25 | 33.73 |
| 7-23 to 7-29 | 98.4 | 95.0 | 9.429 | 10.425 | 152400 | 200300 | 10967.0 | 14228.8 | 72.0 | 71.0 | 5646.4 | 6375.6 | 37.1 | 31.8 | 51.48 | 44.81 |
| 8-30 to 8-05 | 98.0 | 95.4 | 9.503 | 11.087 | 150300 | 174600 | 10440.8 | 12200.6 | 69.5 | 69.9 | 4351.6 | 3975.1 | 29.0 | 22.8 | 41.68 | 32.58 |
| 8-07 to 8-13 | 99.0 | 95.3 | 10.387 | 10.310 | 170600 | 187200 | 10726.7 | 11967.8 | 62.9 | 63.9 | 4250.6 | 3400.4 | 24.9 | 18.2 | 39.63 | 28.40 |
| 8-14 to 8-20 | 98.0 | 93.4 | 9.966 | 10.989 | 279300 | 258800 | 18758.1 | 16956.8 | 67.2 | 65.5 | 8292.6 | 6373.9 | 29.7 | 24.6 | 44.21 | 37.59 |
| 8-21 to 8-26 | 98.2 | 91.0 | 8.377 | 10.873 | 248100 | 216900 | 14736.5 | 12476.9 | 59.4 | 57.5 | 6935.6 | 3552.6 | 28.0 | 16.4 | 47.06 | 28.47 |
| | | | | | | AMENDED DATA NO AMENDMENT | | | | | | | | | | |
| 11-13 to 11-15 | 90.3 | 87.0 | 8.489 | 10.439 | 92066 | 96030 | 8603.6 | 8998.1 | 93.5 | 93.7 | 5649.7 | 5200.1 | 61.4 | 54.2 | 65.67 | 57.79 |
| | | | | | | D2 AMENDED | | | | | | | | | | |
| 11-17 to 11-23 | 90.0 | 85.6 | 8.378 | 9.655 | 91602 | 137926 | 10829.1 | 16028.0 | 118.2 | 116.2 | 7909.9 | 10995.8 | 86.4 | 79.7 | 73.04 | 68.60 |
| 11-24 to 11-30 | 90.0 | 83.4 | 8.884 | 10.405 | 144293 | 147580 | 19203.0 | 19581.3 | 133.1 | 132.7 | 14186.0 | 13760.5 | 98.3 | 93.2 | 73.88 | 70.27 |
| 12-01 to 12-07 | 93.6 | 84.4 | 8.018 | 9.414 | 75674 | 103841 | 9804.5 | 13385.0 | 129.6 | 128.9 | 7502.6 | 9665.9 | 99.1 | 88.4 | 76.52 | 72.21 |
| 12-08 to 12-14 | 94.0 | 84.2 | 8.330 | 9.483 | 111587 | 166518 | 12507.6 | 18013.0 | 113.0 | 108.2 | 9088.4 | 12055.7 | 81.4 | 72.4 | 72.09 | 66.93 |
| 12-15 to 12-21 | 93.4 | 81.4 | 9.296 | 9.126 | 92835 | 80977 | 11898.5 | 10572.0 | 128.2 | 130.6 | 8990.5 | 7743.8 | 96.8 | 95.6 | 75.56 | 70.41 |
| 12-22 to 12-28 | 93.8 | 80.9 | 8.340 | 8.331 | 64462 | 39539 | 11726.4 | 7108.8 | 181.9 | 179.8 | 9690.7 | 5862.7 | 150.3 | 148.3 | 82.64 | 82.47 |
| 12-29 to 1-03 | 92.6 | 81.3 | 8.048 | 8.396 | 62080 | 48324 | 10368.9 | 8130.5 | 163.9 | 168.3 | 8297.9 | 6592.7 | 133.7 | 136.4 | 80.03 | 81.07 |
| | | | | | | NO AMENDMENT | | | | | | | | | | |
| 1-13 to 1-17 | 88.8 | 81.8 | 8.215 | 9.684 | 120169 | 117187 | 16303.2 | 15903.2 | 135.7 | 135.7 | 12562.7 | 11316.5 | 104.5 | 96.6 | 77.06 | 71.16 |
| | | | | | | D1 AMENDED | | | | | | | | | | |
| 1-18 to 1-24 | 86.4 | 81.6 | 8.863 | 10.191 | 116001 | 208289 | 14551.0 | 26171.4 | 114.9 | 111.2 | 10654.8 | 18137.2 | 91.9 | 87.1 | 73.22 | 69.30 |
| 1-25 to 1-31 | 88.6 | 83.0 | 9.429 | 10.887 | 124592 | 182441 | 17936.7 | 25618.5 | 144.0 | 140.4 | 13355.9 | 18244.1 | 107.2 | 99.3 | 74.46 | 71.21 |
| 2-1 to 2-7 | 88.0 | 82.0 | 11.751 | 11.572 | 116016 | 192859 | 10259.8 | 17057.0 | 88.4 | 88.4 | 4918.0 | 8607.5 | 42.4 | 44.6 | 47.93 | 50.46 |
| 28 to 2-14 | 87.7 | 82.4 | 8.841 | 11.820 | 122621 | 158765 | 16184.9 | 20881.2 | 131.9 | 131.5 | 12115.9 | 13778.1 | 98.8 | 86.8 | 74.91 | 65.98 |
| 2-15 to 2-21 | 89.6 | 83.1 | 7.579 | 12.047 | 118687 | 183939 | 11096.3 | 16810.2 | 93.5 | 91.4 | 7675.6 | 8431.0 | 64.7 | 45.8 | 69.17 | 50.15 |
| 2-22 to 2-28 | 89.6 | 85.5 | 8.709 | 12.038 | 88398 | 182143 | 10073.6 | 20755.6 | 114.0 | 144.0 | 7161.6 | 12460.1 | 81.0 | 68.4 | 71.09 | 60.03 |
| 2-29 to 3-6 | 86.0 | 86.7 | 8.506 | 11.778 | 82927 | 114950 | 9069.2 | 12558.5 | 109.4 | 109.3 | 6394.0 | 7443.3 | 77.1 | 64.8 | 70.50 | 59.27 |
| 3-7 to 3-13 | 89.8 | 87.3 | 8.146 | 11.461 | 135246 | 155413 | 13860.8 | 15460.8 | 102.5 | 99.3 | 9741.0 | 8694.7 | 71.6 | 55.9 | 70.28 | 56.33 |

TABLE 33

Weekly Average Retention Time and Conversion of the Chelating Agent Field Test

| | Average Temp (°F.) D1 | Average Temp (°F.) D2 | Retention Time, days D1 | Retention Time, days D2 | (CI-CO)/CO D1 | (CI-CO)/CO D2 | Inverse of Retention Time, days-1 D1 | Inverse of Retention Time, days-1 D2 | (CI-CO)/CI D1 | (CI-CO)/CI D2 |
|---|---|---|---|---|---|---|---|---|---|---|
| | | | | | D2 AMENDED | | | | | |
| 11-17 to 11-23 | 90.0 | 85.6 | 52.2 | 38.9 | 2.727 | 2.180 | 0.0192 | 0.0257 | 0.7304 | 0.6860 |
| 11-24 to 11-30 | 90.0 | 83.4 | 33.1 | 36.4 | 2.958 | 2.369 | 0.0302 | 0.2075 | 0.7388 | 0.7027 |
| 12-01 to 12-07 | 93.6 | 84.4 | 63.2 | 51.7 | 3.270 | 2.618 | 0.0158 | 0.0193 | 0.7652 | 0.7221 |
| 12-08 to 12-14 | 94.0 | 84.2 | 42.9 | 32.2 | 2.584 | 2.015 | 0.0233 | 0.0311 | 0.7209 | 0.6693 |
| 12-15 to 12-21 | 93.4 | 81.4 | 51.5 | 66.3 | 3.083 | 2.781 | 0.0194 | 0.0151 | 0.7556 | 0.7041 |
| 12-22 to 12-28 | 93.8 | 80.9 | 74.2 | 135.8 | 4.762 | 4.702 | 0.0135 | 0.0074 | 0.8264 | 0.8247 |
| 12-29 to 1-03 | 92.6 | 81.3 | 66.0 | 95.3 | 4.381 | 4.296 | 0.0152 | 0.0105 | 0.8003 | 0.8107 |
| | | | | | D1 AMENDED | | | | | |
| 1-18 to 1-24 | 86.4 | 81.6 | 41.2 | 25.8 | 2.421 | 1.883 | 0.0243 | 0.0388 | 0.7322 | 0.6930 |
| 1-25 to 1-31 | 88.6 | 83.0 | 38.4 | 29.4 | 3.035 | 2.407 | 0.0260 | 0.0340 | 0.7446 | 0.7121 |
| 2-1 to 2-7 | 88.0 | 82.0 | 41.2 | 27.8 | 0.988 | 1.018 | 0.0243 | 0.0360 | 0.4793 | 0.5046 |
| 2-8 to 2-14 | 87.7 | 82.4 | 39.0 | 33.8 | 2.942 | 1.939 | 0.0256 | 0.0296 | 0.7491 | 0.6598 |
| 2-15 to 2-21 | 89.6 | 83.1 | 40.3 | 29.2 | 2.259 | 1.004 | 0.0248 | 0.0342 | 0.6917 | 0.5015 |
| 2-22 to 2-28 | 89.6 | 85.5 | 54.1 | 29.5 | 2.458 | 1.502 | 0.0185 | 0.0339 | 0.7109 | 0.6003 |
| 2-29 to 3-06 | 86.0 | 86.7 | 57.7 | 46.7 | 2.398 | 1.452 | 0.0173 | 0.0214 | 0.7050 | 0.5927 |
| 3-07 to 3-13 | 89.8 | 87.3 | 35.4 | 34.6 | 2.324 | 1.289 | 0.0282 | 0.0289 | 0.7028 | 0.5633 |

It is concluded that the improvement of the 10 uM CA amendment is about 10 percent. The lower 5% improvement in Digester 1 is probably the result of a temperature drop of 4.5° F. These results compare reasonably well with the laboratory studies, which showed an 18 percent improvement with 10 uM CA. In view of the considerable variability and frequent upsets during the field tests, these improvements in rates are considered to be quite good.

EXAMPLE 12

Methanogen Production

The experiments were conducted by pressurizing the gas phase of 150 ml reactors to 20 psig with either $N_2$ or $H_2$ (80%) and $CO_2$ (20%), followed by inoculation with 50 ml of medium and 5 ml of *Methanosarcina barkeri*. Varying quantities of methanol, as the feed source, were added initially to the liquid phase. The reactors were thoroughly agitated in a 37° C. shaker incubator at 100 rpm. The composition and preparation instructions of the medium used are given in Table 34.

TABLE 34

| Minimal Medium for Methanogen Growth | | |
|---|---|---|
| Basic Solutions | Component | Concentration |
| A. Basic Solutions | | |
| I. Minerals A | $K_2HPO_4$ | 6.0 g/L |
| II. Minerals | $KH_2PO_4$ | 6.0 g/L |
| | $(NH_4)_2SO_4$ | 12.0 g/L |
| | NaCl | 12.0 g/L |
| | $MgSO_4$ | 2.6 g/L |
| | $MgCl_2$ | 4.0 g/L |
| III. Trace Minerals | $CoCl_2$ | 0.1 g/L |
| | $Na_2MoO_4$ | 0.24 g/L |
| | $NiCl_2$ | 0.24 g/L |
| IV. Vitamins | biotin | 2 mg/L |
| | folic acid | 2 mg/L |
| | pyridoxine HCl | 10 mg/L |
| | thiamine HCl | 5 mg/L |
| | riboflavin | 5 mg/L |
| | nicotinic acid | 5 mg/L |
| | Ca-pantothenate | 5 mg/L |
| | vitamin B-12 | 0.1 mg/L |
| | P-Amino benzoic acid | 5 mg/L |
| | thioctic acid | 5 mg/L |
| B. Preparation for One Liter of Methanogen Medium | | |
| 50 ml Basic Solution I, Minerals A | | |
| 50 ml Basic Solution II, Minerals B | | |
| 10 ml Basic Solution III, Trace Minerals | | |
| 10 ml Basic Solution IV, Vitamins | | |
| 2.7 g $NH_4Cl$ | | |
| 2.5 g Na-Acetate | | |
| 5.0 g Na-bicarbonate | | |
| 0.01 g $FeSO_4$ | | |
| 1 ml of 1% resazurin | | |
| Add distilled water to 1 L. | | |
| Adjust pH to 6.9 with HCl solution | | |
| Boil and dispense under $N_2$ | | |
| Exchange head-space with 80% $H_2$ and 20% $CO_2$ | | |
| Autoclave | | |
| Reduce with 2.5% cysteine/sulfide | | |

The resultant cell concentrations from these experiments are listed in Tables 35 and 36. The reactors without $H_2$ and $CO_2$ did not grow to high concentrations. Methanol, up to a concentration of 1.2 percent, is not an inhibitor. The cell concentration reaches a maximum of 15.25 g/L after 4 days. The results of these batch experiments show that $H_2$ and $CO_2$ are required for rapid growth and that the methanol concentration should not exceed 1.2 percent.

TABLE 35

| Methanogen Batch Growth on Methanol Under $N_2$ or $H_2$ and $CO_2$ | | |
|---|---|---|
| MeOH Concentration | Cell concentrations (g/l) after 4 days | |
| [percent] | $N_2$ | $H_2$ and $CO_2$ |
| 0 | 3.25 | 4.88 |
| 0.2 | 4.25 | 5.50 |
| 0.4 | 3.25 | 8.25 |
| 0.6 | 2.34 | 9.12 |
| 1.0 | 2.50 | 15.25 |

TABLE 36

| Methanogen Batch Growth on Methanol Under $H_2$ and $CO_2$ | | | |
|---|---|---|---|
| MeOH Concentration (percent) | Day 1 | Day 3 | Day 5 |
| 0 | 5.5 | 7.5 | 8.4 |
| 1.2 | 8.3 | 11.5 | 12.0 |
| 1.6 | 5.5 | 8.8 | 10.5 |
| 2.0 | 5.3 | 2.8 | 2.0 |
| 3.0 | 3.3 | 2.5 | — |
| 4.0 | 3.0 | 2.3 | — |

Fed-batch experiments were conducted in an attempt to increase the cell concentration. Since both methanol and $H_2$ and $CO_2$ can be used as carbon and energy sources, the fed-batch experiments had to accommodate the addition of both substrates. These experiments were conducted in 150 ml sealed reactors with 50 ml of medium and an inoculum of 5 ml *Methanosarcina barkeri*. Methanol, in concentrations of 0.6 to 1.0 percent, was added at varying intervals, with $H_2$ and $CO_2$ replenished every one to three days. The results of adding $H_2$ and $CO_2$ every one, two, or three days are given in Tables 37, 38 and 39, respectively. In some of these studies, methanogen media or concentrated media were also added.

TABLE 37

| Methanogen Growth Studies with $H_2$ and $CO_2$ Re-pressurized Every Day | | | | | | |
|---|---|---|---|---|---|---|
| Methanol Addition | Conc. Media Addition | 4 days | 7 days | 10 days | 13 days | 16 days |
| none | 0 | 6.8 | 10.9 | 11.2 | 14.8 | 18.5 |
| (0.2%/day | 0 | 12.5 | 14.8 | 15.0 | 17.0 | 12.3) |
| 0.6%/day | 0 | 17.8 | 25.5 | 25.8 | 30.0 | 17.0 |
| 1.0%/2 day | 0 | 17.0 | 24.3 | 24.8 | 18.0 | 12.0 |
| 0.6%/day | 1 ml/day | 15.5 | 23.5 | 24.3 | 26.3 | 25.8 |
| 1.0%/2 day | 1 ml/day | 20.0 | 23.5 | 25.0 | 16.3 | — |
| 1.0%/2 day | 1 ml/2 day | 17.0 | 23.0 | 21.5 | 20.0 | 9.3 |

TABLE 38

| Methanogen Growth Studies with $H_2$ and $CO_2$ Re-pressurized Every Two Days | | | | | |
|---|---|---|---|---|---|
| Methanol Addition | Cell Concentration, (g/l) | | | | |
| | 3 days | 6 days | 9 days | 12 days | 15 days |
| none | 6.3 | 9.3 | 9.5 | 11.0 | 8.8 |
| 1.0% once only | 17.3 | 13.5 | 14.8 | 10.0 | |
| (0.2%/day | 14.8(4) | 18.8(7) | 18.8(10) | 16.3(13) | 14.0) |
| 0.6%/day | 13.0 | 29.8 | 33.5 | 37.5 | 37.0 |
| 1.0%/2 day | 13.5 | 24.0 | 35.0 | 36.5 | 38.5 |
| 1.0%/3 day | 12.8 | 24.5 | 24.0 | 27.8 | 26.0 |

TABLE 39

| | Methanogen Growth Studies with $H_2$ and $CO_2$ Repressurized Every Three Days. | | | | |
|---|---|---|---|---|---|
| Methanol Addition | Media Addition | 3 days | 6 days | 9 days | 12 days |
| 0.6%/day | 0 | 4.8 | 7.3 | 5.0 | 5.8 |
| 1.0%/2 day | 0 | 4.0 | 10.3 | 11.0 | 9.0 |
| 0.6%/day | 5 ml/3 day | 3.0 | 5.9 | 4.8 | 5.3 |
| 1.0%/2 day | 5 ml/3 day | 3.4 | 8.3 | 6.5 | 6.3 |

Further studies examined the effect of adding 1.0% methanol every two days with gas addition every two days, adding 0.4% every day with re-pressurization every day, adding no methanol every day with re-pressurization every day, and adding 0.3 ml of 10% yeast extract at day 9 for each of these trials. The results are given in Table 40.

TABLE 40

| | Methanogen Growth Studies with $H_2$—$CO_2$ Gas Cylinder | | | | | |
|---|---|---|---|---|---|---|
| Methanol Addition | $H_2$—$CO_2$ Addition | 3 days | 6 days | 9 days | 12 days | 15 days |
| none | every day | 8.68 | 12.00 | 16.67 | 22.08 | 25.83 |
| 0.4%/day | every day | 24.00 | 24.75 | 27.68 | 38.34 | 28.33 |
| 1.0%/2 day | every 2 days | 19.25 | 35.00 | 38.71 | 40.41 | 43.75 |

EXAMPLE 13

Methanogen Preservation

*Methanosarcina barkeri* was preserved by either freeze-drying or ultra-freezing. The cells were prepared for preservation in sealed vessels with a $H_2$—$CO_2$ environment to insure anaerobic conditions. Cryoprotective agents were added as follows: for freeze-drying, equal volumes of 24 percent sucrose or 20 percent skim milk; for ultra-freezing, 5 volume percent dimethyl sulfoxide (DMSO) or 10 volume percent glycerol.

After preservation, the freeze dried cells were recovered in the same sealed vessel by injecting the original volume of medium. Ultra-freezer samples were rapidly thawed under moderate agitation in a 40° C. water bath. The viability of the cultures was then measured by transferring one ml of culture into a 25 ml tube with 9 ml of medium. Successive identical transfers were made with identical dilution until no growth of cells was detected. The tubes were provided 20 psig of $H_2$—$CO_2$ for growth. The growth was measured by the volume of methane produced, determined by gas chromatography.

The preservation periods investigated included one week, and one, two, and three months. The results of the viability tests are listed in Table 41. These results show that both the freeze-dried cells with sucrose and the ultra-frozen cells have the potential to reach the viability of unpreserved cells after three months storage. There are some inconsistencies in the viability reached at different preservation periods for the same method. These problems could be caused by the short time for growth allowed in the one week and the one month tests. In these experiments, the investigation was stopped after six days, or the same time that the unpreserved samples reached the maximum viability. The gas measurements were not conducted every day in these tests. However, for the two and three month experiments, the viability was tested every day for two weeks.

TABLE 41

| | The Viability of Methanogen Preservation | | | | |
|---|---|---|---|---|---|
| | Viability | | | | |
| Method | zero day | one week | one month | two months | three months |
| Un-preserved | $10^6$ | | | | |
| Freeze-Drying | | | | | |
| no protection | | $10^2$ | — | $10^3$ | |
| milk | | $10^6$ | $10^6$ | $10^6$ | $10^4$ |
| sucrose | | $10^4$ | $10^5$ | $10^6$ | $10^6$ |
| Ultra-Freezing | | | | | |
| no protection | | $10^4$ | $10^5$ | $10^6$ | $10^6$ |
| DMSO | | $10^6$ | $10^6$ | $10^6$ | $10^6$ |
| glycerol | | $10^5$ | $10^6$ | $10^4$ | $10^6$ |

Viability is expressed as the maximum amount of culture dilution at which cell growth could be detected. For example, $10^6$ means that the culture was diluted by a factor of one million and cells were still present.

The time required to reach a certain viability may provide a better means for selection of the best preservation method. These results are given in Table 42. As shown, good results are obtained when cells are preserved by ultra-freezing with DMSO, which gives the fastest response and is very close to the result of the unpreserved samples. Protection with glycerol was almost as good; however, the performance in the two month test gave only $10^4$ viability. Interestingly, cells without cryprotection recover from ultra-freezing, but only about half as quickly. Preservation by freeze-drying was not as effective as by ultra-freezing.

TABLE 42

| | Days Required to Reach Full Viability of *Methanosarcina barkeri* | | | | | | | | | | | |
|---|---|---|---|---|---|---|---|---|---|---|---|---|
| | 2 Month Preservation | | | | | | 3 Month Preservation | | | | | |
| Viability | $10^1$ | $10^2$ | $10^3$ | $10^4$ | $10^5$ | $10^6$ | $10^1$ | $10^2$ | $10^3$ | $10^4$ | $10^5$ | $10^6$ |
| Freeze-Drying | | | | | | | | | | | | |
| No protection | 4 | 8 | 10 | — | — | — | | | | | | |
| Skim Milk | 1 | 1 | 3 | 5 | 7 | 10 | 1 | 2 | 4 | 6 | — | — |
| Sucrose | 1 | 2 | 3 | 5 | 6 | 10 | 1 | 2 | 5 | 6 | 10 | 10 |
| Ultra-Freezing | | | | | | | | | | | | |
| No protection | 1 | 1 | 2 | 6 | 6 | 7 | 1 | 1 | 2 | 7 | 9 | 10 |
| DMSO | 1 | 1 | 1 | 3 | 4 | 5 | 1 | 1 | 2 | 3 | 4 | 5 |
| Glycerol | 1 | 1 | 4 | 8 | — | — | 1 | 1 | 2 | 5 | 5 | 6 |
| Un-preserved | 1 | 1 | 1 | (3) | (4) | 5 | 1 | 1 | 1 | (3) | (4) | 5 | note: ( ) estimated.

I claim:

1. A method for improved performance of anaerobic solids digesters comprising the addition of at least one chelating agent to a solid substrate for solubilizing solid nutrients to enhance bacterial growth.

2. The method of claim 1, further comprising the addition of at least one nutrient.

3. The method according to claim 2, wherein the chelating agent is selected from the group consisting of 1:2 diaminocyclonexane-N, N-tetra acetic acid (CDTA), ethylenedimaine tetra acetic acid (EDTA), citric acid (CA), and nitrilo trieacetic acid (NTA).

4. The method according to claim 2, wherein the chelating agent comprises nitrilo triscetic acid (NTA).

5. The method according to claim 2, wherein the nutrient is selected from the group consisting of iron, sulfide, selenium, and nickel.

6. The method according to claim 2, wherein the nutrient comprises FESO$_4$.

7. The method according to claim 2, wherein the nutrients are selected from the group consisting of FESO$_4$, FeCl$_2$, SeO$_2$, and NiCl$_2$.

8. The method according to claim 2, wherein the dosage of said chelating agent is approximately 10 uM.

9. The method according to claim 2, wherein the dosage of said chelating agent ranges about 1 uM to about 100 uM.

10. The method according to claim 2, wherein the concentration of nutrients is approximately 10 uM.

11. The method according to claim 2, wherein the concentration of nutrients ranges from about 1 uM to about 5000 uM.

12. The method according to claim 1, wherein the chelating agent is selected from the group consisting of 1:2 diaminocyclonexane-N, N-tetra acetic acid (CDTA), ethylenediamine tetra acetic acid (EDTA), citric acid (CA), and nitrilo triacetic acid (NTA).

13. The method according to claim 1, wherein the chelating agent comprises nitrilo triacetic acid (NTA).

14. The method according to claim 1, wherein the dosage of said chelating agent is approximately 10 uM.

15. The method according to claim 1, wherein the dosage of said chelating agent ranges about 1 uM to about 100 uM.

16. A method for improved performance of anaerobic solids digesters comprising the addition of a chelating agent comprising 1:2 diamino cyclohexane-N, N-tetra acetic acid (CDTA) to a solid substrate for solubilizing solid nutrients to enhance bacterial growth in combination with the addition of a nutrient comprising FESO$_4$.

* * * * *

UNITED STATES PATENT AND TRADEMARK OFFICE
CERTIFICATE OF CORRECTION

PATENT NO. : 5,342,524

DATED : August 30, 1994

INVENTOR(S) : James L. Gaddy

It is certified that error appears in the above-indentified patent and that said Letters Patent is hereby corrected as shown below:

At column 5, line 66, "$6.1 \times 10^{-3}$" should read $-16.1 \times 10^{-3}-$.

At column 7, line 24, "deltas" should read -deltae-.

At column 11, line 51, ".." should read - . -.

At column 12, line 8, "Amount" should read -amount-.

At column 12, line 24, "Concentration" should read -concentration-.

At column 13, line 3, "C-A" should read -CA-.

At column 15, line 18, "in-" should read -in-.

At column 23, line 66, "IL" should read -1L-.

At column 25, line 20, "mil-lon" should read -million-.

At column 26, line 10 of Table 27, "15.968" should read -16.968-.

At column 27, line 18 of Table 27, "24.445" should read -25.445-.

At column 27, line 27 of Table 27, "31.020" should read -41.020-.

At column 27, line 28 of Table 27, "31.325" should read -41.325-.

At column 27, line 37 of Table 27, "42.825" should read -52.825-.

At column 29, line 31 of Table 28, "83.136" should read -82.136-.

At column 30, line 6 of Table 29, "4.275" should read -4.276-.

At column 31, line 42, "Wast" should read -Waste-.

UNITED STATES PATENT AND TRADEMARK OFFICE
CERTIFICATE OF CORRECTION

PATENT NO. : 5,342,524
DATED : August 30, 1994
INVENTOR(S) : James L. Gaddy

It is certified that error appears in the above-indentified patent and that said Letters Patent is hereby corrected as shown below:

At column 33, line 5, "4.5°F." should read -4.5°F-.

At column 33, Table 32, line 5, "9.296" should read -8.296-.

At column 33, Table 32, line 7, "6592.7" should read -6591.7-.

At column 33, Table 32, line 8, "15460.8" should read -15436.3-.

At column 35, line 64, "reaches" should read -reached-.

At column 37, Table 40, line 2, under 6 days "24.75" should read -27.75-.

In Claim 3, column 39, line 2 of the Patent, change "ethylcnedimaine" to -ethylenediamine-.

In Claim 4, column 39, line 5 of the Patent, change "triscetic" to -triacetic-.

Signed and Sealed this

Eleventh Day of April, 1995

Attest:

BRUCE LEHMAN

*Attesting Officer*  *Commissioner of Patents and Trademarks*